(12) United States Patent
Greenspan et al.

(10) Patent No.: US 11,036,924 B2
(45) Date of Patent: *Jun. 15, 2021

(54) REALTIME SYNCHRONIZED DOCUMENT EDITING BY MULTIPLE USERS FOR BLOGGING

(75) Inventors: David L. Greenspan, San Francisco, CA (US); Aaron Benjamin Iba, San Francisco, CA (US); John D. Zamfirescu-Pereira, Oakland, CA (US)

(73) Assignee: Google LLC, Mountain View, CA (US)

( * ) Notice: Subject to any disclaimer, the term of this patent is extended or adjusted under 35 U.S.C. 154(b) by 1039 days.

This patent is subject to a terminal disclaimer.

(21) Appl. No.: 13/288,010

(22) Filed: Nov. 2, 2011

(65) Prior Publication Data

US 2012/0110445 A1    May 3, 2012

Related U.S. Application Data

(60) Provisional application No. 61/409,488, filed on Nov. 2, 2010.

(51) Int. Cl.
| | |
|---|---|
| *G06F 40/00* | (2020.01) |
| *G06F 40/166* | (2020.01) |
| *G06F 40/197* | (2020.01) |
| *G06F 40/169* | (2020.01) |
| *G06F 16/176* | (2019.01) |

(52) U.S. Cl.
CPC ......... *G06F 40/166* (2020.01); *G06F 16/176* (2019.01); *G06F 40/169* (2020.01); *G06F 40/197* (2020.01)

(58) Field of Classification Search
CPC .. G06F 17/24; G06F 17/241; G06F 17/30165; G06F 40/166; G06F 16/176; G06F 40/169; G06F 40/197

USPC ........ 715/229, 230, 234, 255, 256, 751, 760
See application file for complete search history.

(56) References Cited

U.S. PATENT DOCUMENTS

| | | | |
|---|---|---|---|
| 4,809,170 A | 2/1989 | Leblang et al. | |
| 5,600,834 A | 2/1997 | Howard | |
| 5,649,200 A | 7/1997 | Leblang et al. | |

(Continued)

FOREIGN PATENT DOCUMENTS

| | | |
|---|---|---|
| CN | 1838111 A | 9/2006 |
| CN | 101127644 A | 2/2008 |

(Continued)

OTHER PUBLICATIONS

Day-Richter, What's different about the new Google Docs: Making Collaboration Fast, Sep. 23, 2010, 10 pgs.*

(Continued)

*Primary Examiner* — Cesar B Paula
*Assistant Examiner* — David Faber
(74) *Attorney, Agent, or Firm* — Lowenstein Sandler LLP

(57) ABSTRACT

Copies of a document are sent to a plurality of clients for realtime editing, and respective changesets for two or more respective clients in the plurality of clients are obtained. A respective changeset represents one or more changes to a respective copy of the document at a respective client. A result changeset is generated in accordance with the respective changesets, and the result changeset is sent to the plurality of clients for updating the respective copies of the document at the plurality of clients.

25 Claims, 16 Drawing Sheets

(56) References Cited

U.S. PATENT DOCUMENTS

| | | | |
|---|---|---|---|
| 5,671,428 A | 9/1997 | Muranaga et al. | |
| 5,675,802 A | 10/1997 | Allen et al. | |
| 5,805,889 A | 9/1998 | Van De Vanter | |
| 5,806,078 A | 9/1998 | Hug et al. | |
| 5,890,176 A | 3/1999 | Kish et al. | |
| 5,940,082 A | 8/1999 | Brinegar et al. | |
| 6,006,239 A * | 12/1999 | Bhansali | G06F 40/18 |
| 6,157,934 A * | 12/2000 | Khan | G06Q 10/10 |
| | | | 709/203 |
| 6,181,736 B1 | 1/2001 | McLaughlin et al. | |
| 6,212,548 B1 | 4/2001 | DeSimone et al. | |
| 6,681,382 B1 | 1/2004 | Kakumani et al. | |
| 6,715,129 B1 * | 3/2004 | Hind | G06F 40/166 |
| | | | 715/239 |
| 6,772,216 B1 | 8/2004 | Ankireddipally et al. | |
| 6,792,454 B2 | 9/2004 | Nakano et al. | |
| 6,915,336 B1 | 7/2005 | Hankejh et al. | |
| 7,047,281 B1 * | 5/2006 | Kausik | H04L 67/06 |
| | | | 709/213 |
| 7,111,044 B2 | 9/2006 | Lee | |
| 7,188,140 B1 | 3/2007 | Greenspan et al. | |
| 7,222,138 B2 | 5/2007 | Fomenko | |
| 7,222,156 B2 | 5/2007 | Gupta et al. | |
| 7,228,319 B1 | 6/2007 | Fuchs | |
| 7,233,951 B1 | 6/2007 | Gainer et al. | |
| 7,299,450 B2 | 11/2007 | Livshits et al. | |
| 7,440,623 B2 | 10/2008 | Miura et al. | |
| 7,593,943 B2 | 9/2009 | Clarke et al. | |
| 7,644,392 B2 | 1/2010 | Geipel et al. | |
| 7,756,391 B1 | 7/2010 | Trottier et al. | |
| 7,818,663 B2 | 10/2010 | Khaba | |
| 7,849,443 B2 | 12/2010 | Clemm et al. | |
| 7,899,883 B2 | 3/2011 | Rasmussen et al. | |
| 7,941,399 B2 | 5/2011 | Bailor et al. | |
| 7,974,948 B2 | 7/2011 | Baer et al. | |
| 8,028,229 B2 | 9/2011 | Bailor et al. | |
| 8,087,000 B2 | 12/2011 | Cartledge et al. | |
| 8,434,002 B1 * | 4/2013 | Shah | G06F 40/106 |
| | | | 715/255 |
| 2002/0049786 A1 * | 4/2002 | Bibliowicz | G06Q 10/10 |
| | | | 715/211 |
| 2002/0087547 A1 * | 7/2002 | Kausik | H04L 67/06 |
| 2002/0138511 A1 * | 9/2002 | Psounis | H04L 67/2852 |
| | | | 715/255 |
| 2003/0167446 A1 * | 9/2003 | Thomas | G06F 40/14 |
| | | | 715/229 |
| 2003/0172168 A1 * | 9/2003 | Mak | G06F 17/30569 |
| | | | 709/230 |
| 2004/0073581 A1 | 4/2004 | McVoy et al. | |
| 2004/0181796 A1 * | 9/2004 | Fedotov | G06F 3/1454 |
| | | | 719/323 |
| 2004/0205538 A1 * | 10/2004 | Banerjee | G06F 40/166 |
| | | | 715/256 |
| 2004/0205653 A1 | 10/2004 | Hadfield et al. | |
| 2004/0210823 A1 | 10/2004 | Miura et al. | |
| 2004/0221323 A1 | 11/2004 | Watt | |
| 2004/0260974 A1 | 12/2004 | Livshits | |
| 2004/0267871 A1 | 12/2004 | Pratley et al. | |
| 2005/0039116 A1 | 2/2005 | Slack-Smith | |
| 2005/0044531 A1 | 2/2005 | Chawla et al. | |
| 2005/0076068 A1 | 4/2005 | Fowler et al. | |
| 2005/0108402 A1 | 5/2005 | Colson et al. | |
| 2005/0166154 A1 | 7/2005 | Wilson et al. | |
| 2005/0234943 A1 | 10/2005 | Clarke | |
| 2006/0178918 A1 | 8/2006 | Mikurak | |
| 2006/0235984 A1 | 10/2006 | Kraus et al. | |
| 2006/0277210 A1 | 12/2006 | Starbuck | |
| 2006/0282479 A1 | 12/2006 | Johnson et al. | |
| 2006/0288054 A1 | 12/2006 | Johnson et al. | |
| 2006/0288055 A1 | 12/2006 | Johnson et al. | |
| 2007/0050234 A1 | 3/2007 | Corlett | |
| 2007/0061702 A1 | 3/2007 | Letkeman | |
| 2007/0130257 A1 | 6/2007 | Bedi et al. | |
| 2007/0198648 A1 | 8/2007 | Allen et al. | |
| 2007/0233811 A1 * | 10/2007 | Rochelle | G06F 40/174 |
| | | | 709/219 |
| 2007/0250506 A1 | 10/2007 | Stevens et al. | |
| 2007/0250531 A1 | 10/2007 | Wiggins et al. | |
| 2007/0271340 A1 | 11/2007 | Goodman et al. | |
| 2007/0294283 A1 * | 12/2007 | Mackay | G06F 40/197 |
| 2008/0059539 A1 * | 3/2008 | Chin | G06Q 10/10 |
| 2008/0077848 A1 * | 3/2008 | Roberts | G06F 40/197 |
| | | | 715/229 |
| 2008/0104140 A1 | 5/2008 | Vierich et al. | |
| 2008/0178117 A1 * | 7/2008 | Gelman | G06F 3/0481 |
| | | | 715/808 |
| 2008/0208869 A1 | 8/2008 | Van Riel | |
| 2008/0208969 A1 | 8/2008 | Van Riel | |
| 2009/0055799 A1 | 2/2009 | Cao et al. | |
| 2009/0177744 A1 | 7/2009 | Marlow et al. | |
| 2009/0217196 A1 * | 8/2009 | Neff | G06F 16/9535 |
| | | | 715/799 |
| 2009/0228555 A1 | 9/2009 | Joviak et al. | |
| 2009/0249224 A1 * | 10/2009 | Davis | G06F 40/169 |
| | | | 715/753 |
| 2009/0271806 A1 | 10/2009 | McDonald et al. | |
| 2009/0313331 A1 | 12/2009 | Rasmussen et al. | |
| 2010/0063961 A1 | 3/2010 | Guiheneuf et al. | |
| 2010/0070882 A1 | 3/2010 | Wang | |
| 2010/0083136 A1 | 4/2010 | Komine et al. | |
| 2010/0095198 A1 * | 4/2010 | Bultrowicz | G06F 40/169 |
| | | | 715/234 |
| 2010/0169269 A1 | 7/2010 | Chandrasekaran | |
| 2010/0241943 A1 * | 9/2010 | Massand | G06F 40/194 |
| | | | 715/227 |
| 2010/0257457 A1 | 10/2010 | De Goes | |
| 2010/0306185 A1 | 12/2010 | Smith et al. | |
| 2011/0161376 A1 | 6/2011 | Dickson et al. | |
| 2011/0225417 A1 * | 9/2011 | Maharajh | H04L 65/4076 |
| | | | 713/150 |
| 2011/0296317 A1 * | 12/2011 | Ishihara | G06F 17/2211 |
| | | | 715/753 |
| 2012/0062712 A1 * | 3/2012 | Kesseler | H04N 13/0059 |
| | | | 348/56 |
| 2013/0212250 A1 * | 8/2013 | Kleppner | H04L 67/06 |
| | | | 709/224 |
| 2013/0218845 A1 * | 8/2013 | Kleppner | G06F 16/176 |
| | | | 707/687 |

FOREIGN PATENT DOCUMENTS

| | | |
|---|---|---|
| CN | 101315621 A | 12/2008 |
| KR | 20070043353 A | 4/2007 |
| WO | 0212997 A1 | 2/2002 |
| WO | WO 2005/112374 A1 | 11/2005 |

OTHER PUBLICATIONS

Westfechtel, Bernhard; "Structure-Oriented Merging of Revisions of Software Documents", ACM, 1991, p. 68-79.*
Cayenne-McCall, Synchronous 3D Document Collaboration, Nov. 2008, 41 pages.
Day-Richter, What's different about the new Google Docs: Making Collaboration Fast, Sep. 23, 2010, 6 pgs.
Google Inc., International Search Report and Written Opinion, PCT/US2011/058607, dated Feb. 21, 2012, 12 pgs.
Herrick, Google This! Using Google Apps for Collaboration and Productivity, 2009, pp. 55-63.
Shen, Flexible Merging for Asynchronous Collaborative Systems, 2002, pp. 304-321.
Wang, Google Wave Operational Transformation, Jul. 2010, 6 pgs.
Agarwal, Copy Pictures from Flickr to Picasa Web Albums (or vice-versa), Jul. 30, 2007, 2 pgs.
Balasubramanyan, Cut Once: A Thunderbird Extension for Recipient Prediction and Leak Detection, Oct. 29, 2009, 5 pgs.
Carvalho, Cut Once: A Thunderbird Extension for Recipient Prediction and Leak Detection, Jan. 19, 2008, 3 pgs.
Comer, Conversation-Based Mail, ACM Transactions on Computer Systems, vol. 4, No. 4, Nov. 1986, 21 pgs.

(56) References Cited

OTHER PUBLICATIONS

Dear, TERM-talk: Plato's Instant Messaging, Dec. 19, 2002, 2 pgs.
Dodgeball.com, Mobile Social Software, Feb. 23, 2008, 2 pgs.
Flickr, Help/The Help Forum, Anyone can tell me how to copy all photos from Flickr another album gallery from the other website?, Feb. 23, 2008, 3 pgs.
Flock Browser—Share Pictures, Text and Video, User Guides, Feb. 22, 2008, 8 pgs.
Google Inc., International Search Report and Written Opinion, PCT/US2010/28269, dated Jan. 26, 2011, 8 pgs.
Google Inc., International Search Report and Written Opinion, PCT/US2010/028272, dated Aug. 30, 2011, 8 pgs.
Google Inc., International Search Report and Written Opinion, PCT/US2010/028277, dated Mar. 31, 2011, 8 pgs.
Grob, Cluestr: Mobile Social Networking for Enhanced Group Communication, GROUP '09, Sanibel Island, FL, May 10-13, 2009, 10 pgs.
Hu, Microsoft wins . . . is typing a message IM patent, Oct. 8, 2003, 2 pgs.
Lavallee, Friends Swap Twitters, and Frustration, The Wall Street Journal, Mar. 16, 2007, 3 pgs.
Microsoft Office Online, Help and How-to, Move or Copy and Paste Contacts, Feb. 22, 2008, 2 pgs.
NetWin Advanced Server Software, Dbabble Instant Chat Server Overview, 2009, 3 pgs.
Nichols, High-Latency, Low-Bandwidth Windowing in the Jupiter Collaboration System, Proceedings of UIST '95, 1995, 10 pgs.
Payne, API Documentation—Twitter Development Talk, 2008, 11 pgs.
Plasq, Hey plasq! Scott has an idea, I Wish I Could Drag/Drop Directly Into a File, Aug. 29, 2007, 2 pgs.
Saviano, Annagram Concurrent Text Editor, Penn Engineering, 2006, 2 pgs.
TechHit.com, SimplyFile—Intelligent Filing Assistant for Microsoft Outlook, Feb. 16, 2011, 2 pgs.
Twitter / Sifow, About Name Sifow, Feb. 22, 2008, 3 pgs.
Twitter Support, Twitter FAQ, Feb. 22, 2008, 8 pgs.
Twitter / Get a Badge for Your Site, Display Twitters on Your Web Page, Feb. 22, 2008, 1 pg.
Webb, Twitter is a Conversation Ecosystem, Chris Webb on Publishing, Media, and Technology, Feb. 22, 2008, 8 pgs.
Webb, What's the Use in Twitter? Where is the Value?, Aug. 15, 2007, 5 pgs.
Yahoo! Messenger Search Help, How do I share photos during a conversation?, Feb. 22, 2008, 1 pg.
International Preliminary Report on Patentability corresponding to International Application No. PCT/US2011/058607 dated May 16, 2013, 10 pgs.
Macdonald et al, "Advances in Information Retrieval", 30th European Conference on IR Research, ECIR 2008, Springer-Verlag Berlin, Heidelberg, Mar./Apr. 2008, 22 pages.
Shen et al., "A Log Compression Algorithm for Operation-based Version Control Systems," Proceedings of the 26th Annual International Computer Software and Applications Conference, COMPSAC 2002, Oxford, England, Aug. 26-29, 2002, Los Alamitos, CA, IEEE Computer Society, vol. CONF. 26, Aug. 26, 2002, 6 pages.
Chinese Patent Application No. 201610563389.X, Office Action Report dated Apr. 3, 2019, 13 pages.
European Patent Application No. 11784859.8, Office Action dated Aug. 21, 2018, 9 pages.

* cited by examiner

REALTIME SYNCHRONIZED DOCUMENT EDITING BY MULTIPLE USERS FOR BLOGGING

CROSS-REFERENCE TO RELATED APPLICATIONS

This application claims priority to U.S. Provisional Application Ser. No. 61/409,488, filed Nov. 2, 2010, which is incorporated herein by reference in its entirety.

This application is related to U.S. patent application Ser. No. 12/431,627 entitled "Realtime Synchronized Document Editing by Multiple Users" and filed Apr. 28, 2009, which in turn claims the benefit of U.S. Provisional Application No. 61/143,374 filed on Jan. 8, 2009 and entitled "Realtime Synchronized Document Editing by Multiple Users." Both of the above-cited applications are incorporated by reference herein in their entireties.

TECHNICAL FIELD

This relates generally to collaborative editing of electronic documents, including but not limited to methods and systems for realtime collaborative editing of various types of electronic documents.

BACKGROUND

Electronic documents are widely used in many areas of our lives. Such electronic documents can be edited from both desktop computers and portable computing devices (e.g., laptop computers, personal digital assistants (PDAs), mobile phones, and wearable computers).

Sometimes multiple editors need to edit a document simultaneously. However, coordinating inputs from multiple editors for a realtime editing is not a trivial problem. Therefore, there is a need for a new method and system for handling inputs from multiple editors for a realtime editing of electronic documents.

SUMMARY

A number of embodiments (e.g., of server systems, client systems or devices, and methods of operating such systems or devices) that overcome the limitations and disadvantages described above are presented in more detail below. These embodiments provide methods, systems, and graphical user interfaces (GUIs) for sending copies of a document for realtime editing, and distributing information associated with changes to the document.

As described in more detail below, some embodiments of the invention involve a method of providing a document to a plurality of clients for realtime editing, including sending copies of the document for realtime editing to the plurality of clients. Respective changesets for two or more respective clients in the plurality of clients are obtained. A respective changeset represents one or more changes to a respective copy of the document at a respective client. A result changeset is generated in accordance with the respective changesets. The result changeset is sent to the plurality of clients for updating the respective copies of the document at the plurality of clients.

A server system for providing a document to a plurality of clients for realtime editing includes one or more processors, and memory storing one or more programs for execution by the one or more processors. The one or more programs include instructions to send copies of the document for realtime editing to the plurality of clients; and instructions to obtain respective changesets for two or more respective clients in the plurality of clients. A respective changeset represents one or more changes to a respective copy of the document at a respective client. The one or more programs also include instructions to generate a result changeset in accordance with the respective changesets; and instructions to send the result changeset to the plurality of clients for updating the respective copies of the document at the plurality of clients.

A computer readable storage medium stores one or more programs configured for execution by one or more processors of a server. The one or more programs include instructions to send copies of the document for realtime editing to the plurality of clients, and instructions to obtain respective changesets for two or more respective clients in the plurality of clients. A respective changeset represents one or more changes to a respective copy of the document at a respective client. The one or more programs include instructions to generate a result changeset in accordance with the respective changesets, and instructions to send the result changeset to the plurality of clients for updating the respective copies of the document at the plurality of clients.

A method of processing a document for realtime editing includes displaying at least a portion of a respective copy of the document. Inputs from a respective user of the client for editing the document are received. Document information is sent to a server connected to a plurality of clients in accordance with the inputs. A result changeset for updating the respective copy of the document at the client is received. The result changeset represents changes to the document based on changes to respective copies of the document at two or more clients in the plurality of clients. The respective copy of the document is updated at the client in accordance with the result changeset.

A client for processing a document for realtime editing includes one or more processors, and memory storing one or more programs for execution by the one or more processors. The one or more programs include instructions to display at least a portion of a respective copy of the document, and instructions to receive inputs from a respective user of the client for editing the document. The one or more programs also include instructions to send, to a server connected to a plurality of clients, document information in accordance with the inputs, and instructions to receive a result changeset for updating the respective copy of the document at the client. The result changeset represents changes to the document based on changes to respective copies of the document at two or more clients in the plurality of clients. The one or more programs further include instructions to update the respective copy of the document at the client in accordance with the result changeset.

A computer readable storage medium stores one or more programs configured for execution by one or more processors of a client. The one or more programs include instructions to display at least a portion of a respective copy of the document, and instructions to receive inputs from a respective user of the client for editing the document. The one or more programs also include instructions to send, to a server connected to a plurality of clients, document information in accordance with the inputs, and instructions to receive a result changeset for updating the respective copy of the document at the client, the result changeset representing changes to the document based on changes to respective copies of the document at two or more clients in the plurality of clients. The one or more programs further include instructions to update the respective copy of the document at the client in accordance with the result changeset.

A method of providing a document to a plurality of clients for realtime editing includes sending to a first client of the plurality of clients a first copy of the document. A second copy of the document is sent to a second client of the plurality of clients. A first changeset is obtained from the first client, and a second changeset is obtained from the second client. The first changeset represents one or more changes to the first copy of the document at the first client, and the second changeset represents one or more changes to the second copy of the document at the second client. A result changeset is generated in accordance with at least the first changeset and the second changeset. The result changeset is sent to the first client for updating the first copy of the document, and to the second client for updating the second copy of the document.

DETAILED DESCRIPTION OF THE INVENTION

Figure 1:
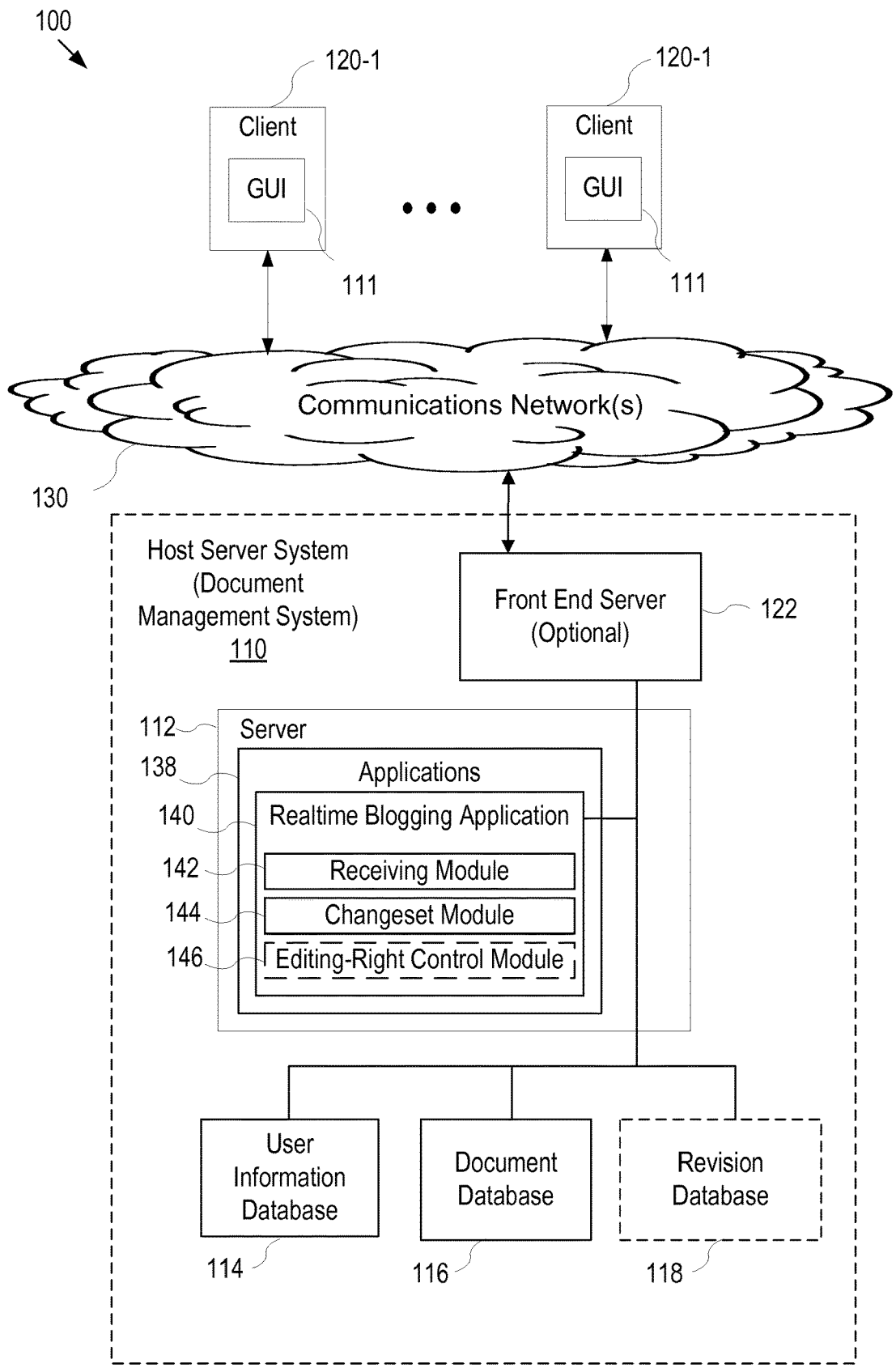
FIG. 1 is a block diagram illustrating an exemplary distributed computer system in accordance with some embodiments.

Methods and systems for providing a document for realtime editing are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the embodiments herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting" or "in accordance with a determination that (a stated condition precedent is true, or not true)," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

As used herein, the term "blog" refers to a web log, which includes a type of websites or part of websites that allow users to enter comments, description of events, or other material such as images, photos, and/or videos. Such actions of entering comments, description, and other material are often called "posting a blog" or "posting to a blog." In some embodiments, blogs permit only users with editing rights to post a blog. In some embodiments, blogs permit only users with access rights to view posted blogs (e.g., entries). In some embodiments, posting a blog is called "blogging." In some other embodiments, "blogging" also refers to accessing blogs (e.g., visiting a website that includes a web log as part of the website). In some embodiments, a blog refers to an electronic forum in which one or more users provide content for viewing by one or more other users. Typically, blogs include more than one blog entry that may be provided over time.

In various embodiments, disclosed are systems that permit collaborative editing of documents, such as text documents, and computer-implemented methods for collaboratively editing text documents. Exemplary systems comprise a host computing system, such as a server, in communication over a network with each of a plurality of client computing systems. In some embodiments, the host and client computing systems run a collaborative text editing web-based application, sometimes referred to as a web application, comprising host code that is executed by the host computing system and client code executed in association with a respective browser application running on each client computing system. The collaborative text editing web application can be used to edit documents other than text documents, for example, graphics documents, spreadsheets, and the like, and text documents are discussed herein merely as an example. Similarly, though the illustrated methods pertain to text documents, the same methods can be applied to collaborative editing of other types of documents.

In some embodiments, each of the client codes and the host code maintains the text document in parallel on their respective computing systems. A client code of a first client computing system receives edits to the text document specified by a user, such as insertions or deletions of characters, modifies its locally maintained text document accordingly, and transmits the edits to the host code of the host computing system. The host code creates a new version of the text document according to the received edits, determines a suitable update for the several client codes running on the other client computing systems, and then provides the update to the other client codes. The other client codes use the update to incorporate the edits from the first client computing system into their locally maintained copies of the text document. Sending edits with sufficient frequency to the host computing system, and rapidly sending the updates to the other client computing systems, allows each user to see the edits of the other users in realtime.

In some embodiments, the realtime editing of a document shared by multiple users is used to provide a realtime blog. A realtime blog is typically a blog in which a master editor provides document content, such as words, characters, images, or other objects, and this content is displayed to viewers of the blog in realtime. A user viewing a realtime blog via a browser and the internet may see objects appear in realtime as they are provided by the master editor. The user may watch as the blog is modified on a character by character or word by word basis, depending on the level of granularity applied to user inputs. Realtime blogs are optionally used to report on events as they are happening. The use of realtime document editing means that the writer of the blog (e.g., the master editor) is continuously updating the view of the blog seen by others as the blog is being modified. A realtime blog optionally includes some content (e.g., blog entries) that are static and some content that is realtime (i.e., content that is updated in realtime).

In some embodiments, realtime blog content may be edited by more than one editor (e.g., junior editors typically being granted editing privileges by the master editor). Both modifications by junior editors and master editors are optionally displayed on clients in realtime, as the modifications are made. Both the master editor and junior editors may make modifications to the same blog entry at the same time, without locking of the blog content. In some embodiments, changes to previous blog content is marked to show that the content was modified, while new material is added in an unmarked form. As an editor is making modifications, the modifications are automatically updated to the blog, and to clients viewing the blog, without further actions by the editor, e.g., without explicit update commands from the editor.

As used herein, a static blog entry or document is an object that is not automatically updated in realtime as modifications are entered by an editor. An update may occur when specifically initiated by the editor, for example, after an editor has finished a blog entry or a substantial part thereof. In a static blog, each update must typically be separately initiated by the editor.

Figure 6:
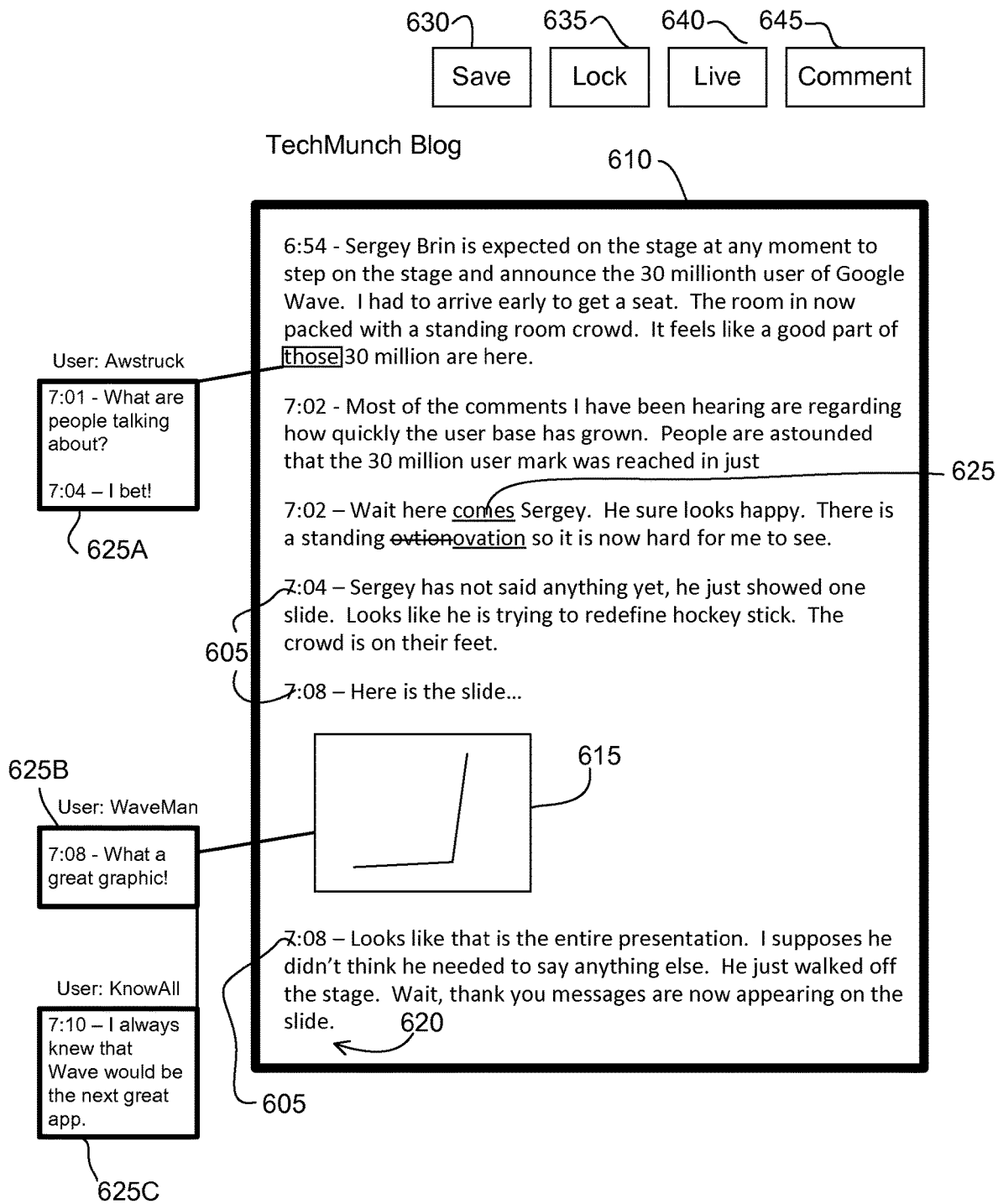
FIG. 6 illustrates an exemplary user interface for realtime blogging in accordance with some embodiments.

A master editor may also control the addition of comments to the realtime blog. For example, a master editor may specify that anyone can add comments from any client, or that a selected group of users and/or clients may add comments to the blog. Comments from other users are optionally added in realtime. For example, while a master editor is adding material to a blog entry, a second user may simultaneously make comments on this blog entry. The comment is optionally displayed to users in realtime. Specifically, the comment may be displayed to other users (and the master user) on a character by character or word by word basis as it is provided by the second user. As can be seen in FIG. 6, a comment is optionally associated with a specific part of a blog entry or with all of the blog entry.

As used herein, the term realtime is used to indicate events that occur proximate in time to their cause, e.g., without unnecessary delay. For example, a realtime document is a document in which modifications to the document are made available as soon as they are received and the document is updated once the modifications are available. As used herein, a realtime editing refers to revising a document in realtime in accordance with a user input (e.g., within a predefined time limit, such as 0.1 second or 0.5 second). In some embodiments, realtime editing includes receiving an input from a user, revising a document in accordance with the user input, and sending the revised document (or the revised portion of the document) to a plurality of users who are associated with the document, all in realtime. A realtime editing environment includes systems and methods of revising at least one document in realtime in accordance with inputs from an editor (or a user). Such inputs may have character by character granularity or word by word granularity (e.g., each input may include a single character or a single word).

FIG. 1 is a block diagram illustrating an exemplary distributed computer system 100, according to certain embodiments. In FIG. 1, system 100 includes one or more client computers 120 (also called client computing systems), communications network(s) 130, and host server system 110 (also called a document management system or a host computing system). System 100 typically includes two or more client computers 120. Various embodiments of host server system 110 implement the document management system described in this document.

Client computers 120 can be any of a number of computing devices (e.g., Internet kiosk, personal digital assistant, cell phone, gaming device, desktop computer, laptop computer, handheld computer, or combinations thereof) used to enable the activities described below. Client computer(s) 120 is also referred to herein as client(s). Client 120 includes graphical user interface (GUI) 111. Client 120 is described in greater detail below with reference to FIG. 3. Client 120 is connected to host server system 110 via communications network 130. As described in more detail below, the GUI 111 is used to display a document or a portion of the document. Host server system 110 provides document management services to a community of users (e.g., employees of a company, members of an organization or group, visitors to a web log (also called a blog), etc.) who access documents from clients 120.

Host server system 110 includes one or more servers, such as server 112, connected to communications network 130. Optionally, the one or more servers are connected to communications network 130 via front end server 122 (e.g., a server that conveys (and optionally parses) inbound requests to the appropriate server of system 110, and that formats responses and/or other information being sent to clients in response to requests). Front end server 122, if present, may be a web server providing web based access to host server system 110. Front end server 122, if present, may also route communications to and from other destinations, such as an authorization system (not shown).

Host server system 110 includes user information database 114, document database 116, and optionally revision database 118. In some embodiments, host server system 110 also includes or has access to one or more other databases, such as an advertisement database (not shown). Server 112 includes applications 138, including realtime blogging application 140. Realtime blogging application 140 includes receiving module 142, changeset module 144, and/or editing-right control module 146. Server 112 communicates with databases internal to the host server system 110, such as user information database 114, document database 116, and optional revision database 118 using a local area network, by internal communication busses, or by any other appropriate mechanism or combination of mechanism.

Server 112 communicates with clients 120 via the front end server 122 (if present) and communication network(s) 130. In some embodiments, the communications network 130 is the Internet. In other embodiments, the communication network 130 can be any local area network (LAN), wide area network (WAN), metropolitan area network, or a combination of such networks. In some embodiments, server 112 is a web server that manages documents using appropriate communication protocols. Alternatively, if server 112 is used within an intranet, it may be an intranet server.

Applications 138 include application programs running on the server 112 including realtime blogging application 140, which is used for managing an online document management system. In some embodiments, applications 138 also include a user information processing module (not shown), where the user information processing module assists in accessing and updating user information database 114. User information database 114 stores various information associated with the users of the host server system 110, including user preferences, editing rights, authentication information, etc. User information database 114 is described in detail below with reference to FIG. 4A.

Receiving module 142 receives changesets and/or inputs from clients 120. Changeset module 144 maintains and updates changesets and/or documents in accordance with received changesets or inputs. In some embodiments, documents are stored in document database 116. In some embodiments, the changesets are stored in document database 116 or revision database 118, if present.

Document database 116 stores various information associated with documents stored in host server system 110 (e.g., document ID, content, editing rights, revision history, etc.). In some embodiments, document database 116 also stores changesets and/or inputs received from clients 120. Document database 116 is described in detail with reference to FIG. 4B.

Optionally, host server system 110 includes revision database 118. Revision database 118 may include changesets and/or inputs received from clients 120. In some embodiments, revision database 118 includes a plurality of versions of a respective document (e.g., versions before and after editing in accordance with user inputs). In some embodiments, revision database 118 includes revision history for one or more documents. In some embodiments, revision database 118 is included in document database 116.

In essence, server 112 is configured to manage certain aspects of host server system 110 (document management system), including receiving revision information (e.g., changesets and/or inputs) from clients 120, and transmitting revision information (with or without further processing) to other clients 120.

Optionally, the host server system 110 is implemented as part of a general document management system that provides document management service for general purposes. Alternatively, the host server system 110 can be implemented as a blogging system that provides document management service exclusively for blogging.

In some embodiments, fewer and/or additional modules, functions or databases are included in host server system 110 and server 112. The modules shown in host server system 110 and server 112 represent functions performed in certain embodiments.

Figure 2:
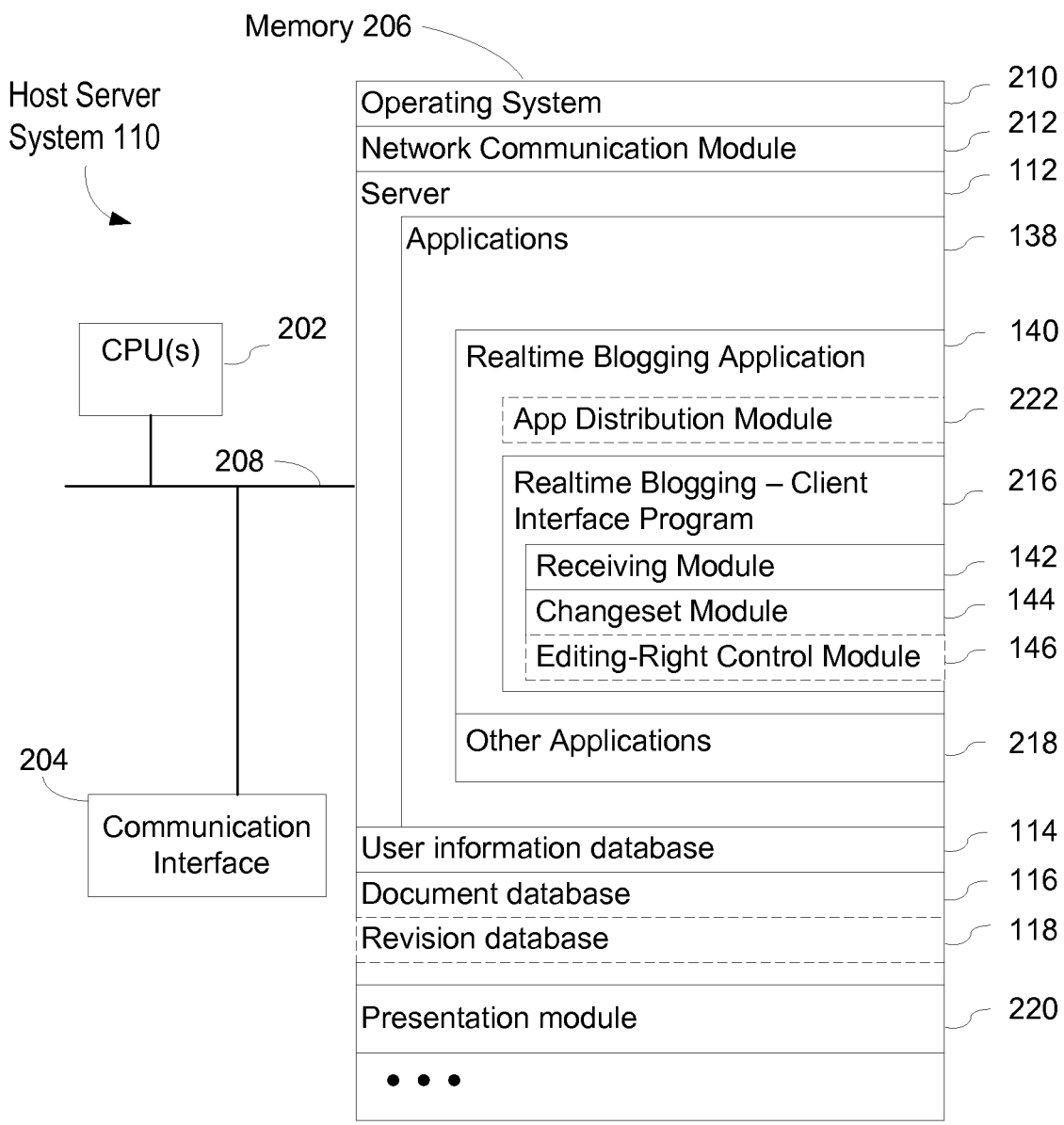
FIG. 2 is a block diagram illustrating a document management system in accordance with some embodiments.

FIG. 2 is a block diagram illustrating host server system 110, also called a document management system in accordance with some embodiments. Host server system 110 typically includes one or more processing units (CPUs) 202, one or more network or other communications interfaces 204, memory 206, and one or more communication buses 208 for interconnecting these components. In some embodiments, the communication buses 208 include circuitry (sometimes called a chipset) that interconnects and controls communications between system components. In some other embodiments, host server system 110 includes a user interface (not shown) (e.g., a user interface having a display device, a keyboard, and a mouse or other pointing device), but more typically host server system 110 is controlled from and accessed by various client systems (e.g., 120).

Memory 206 of host server system 110 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternately the non-volatile memory device(s) within memory 206, comprises a non-transitory computer readable storage medium. In some embodiments, memory 206 or the non-transitory computer readable storage medium of memory 206 stores the following programs, modules and data structures, or a subset thereof:

- Operating System 210 that includes procedures for handling various basic system services and for performing hardware dependent tasks;
- Network Communication Module (or instructions) 212 that is used for connecting host server system 110 to other computers (e.g., clients 120) via the one or more network interfaces 204 and one or more communications networks 130 (FIG. 1), such as the Internet, other wide area networks, local area networks, metropolitan area networks, and so on;
- Server 112 for managing certain aspects of the host server system 110, including document management services; and Presentation module 220 that formats results from server 112 (e.g., realtime blogging application 140) for display at respective clients; for example, presentation module 220 may generate a web page or XML document that includes content of a respective document; in some embodiments presentation module 220 is executed by the front end server 122, which comprises one of the servers implementing the document management system; optionally the presentation module 220 is a module of realtime blogging application 140.

Figure 4A:
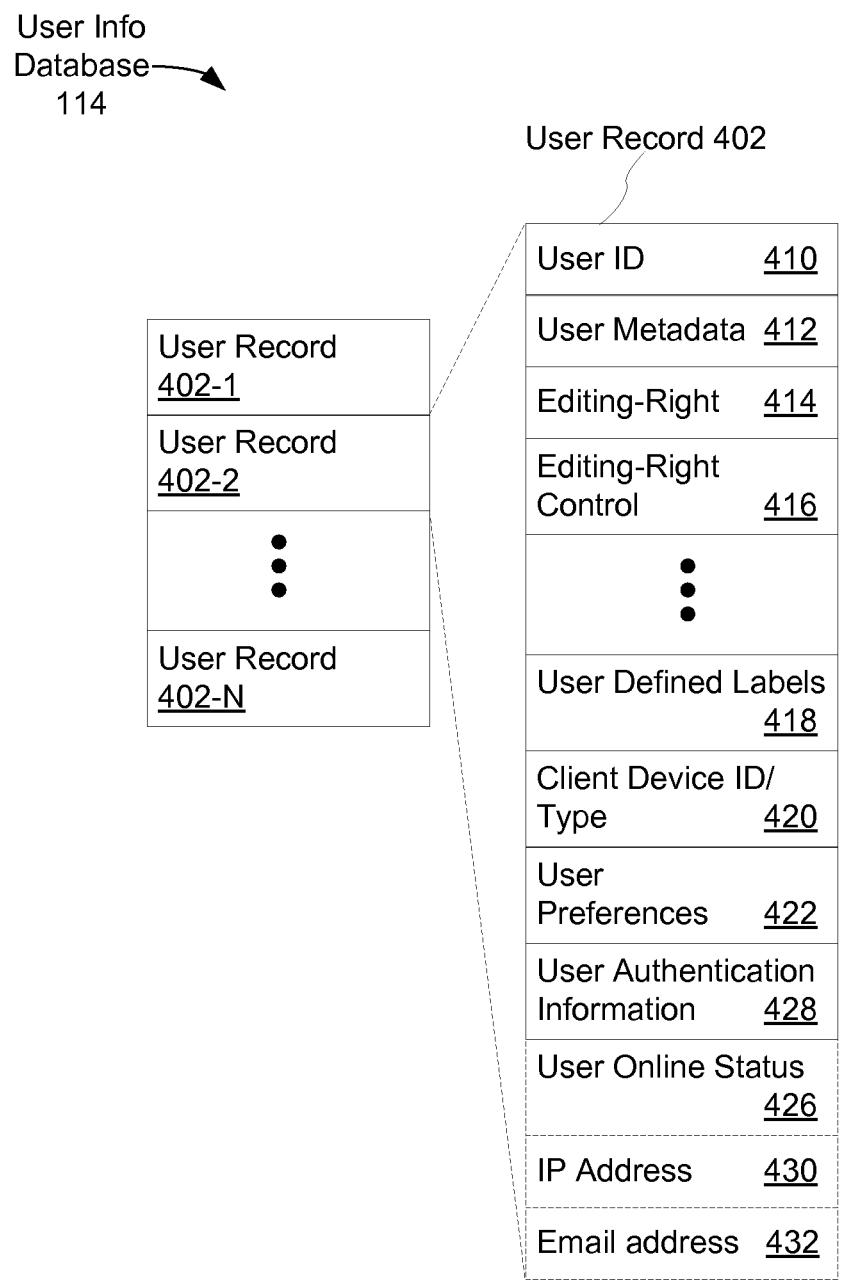
FIG. 4A is a block diagram illustrating exemplary entries in the user database in accordance with some embodiments.

In some embodiments, server 112 includes the following programs, modules and data structures, or a subset or superset thereof:

Applications 138, including realtime blogging application 140 for performing the primary functions of a document management system; application 138 may optionally include other applications 218;

User information database 114 that stores user information (see FIG. 4A);

Document database 116 that stores documents as well as information (e.g., metadata) concerning the stored documents (e.g., document title, document type, creation date, first author, last update timestamp, location, etc.); and Optional revision database 118 that stores revision information concerning documents stored in document database 116 (e.g., changesets, timestamps, editors, editing-rights, editing-right-controls, etc.); otherwise, information concerning editing-rights and editing-right-controls can be stored in user database 114 and/or document database 116.

Realtime blogging application 140 typically processes document-related requests and inputs from and provides responses to clients 120. In some embodiments, realtime blogging application 140 includes realtime blogging—client interface program 216, and/or application distribution module 222.

The realtime blogging—client interface program 216 handles receiving requests and inputs from and sending information to clients 120. In some embodiments, the realtime blogging—client interface program 216 includes:

Receiving Module 142 that receives changesets and/or inputs from clients 120 via communication interface 204 and/or network communication module 212;

Changeset Module 144 that maintains and updates changesets and/or documents in accordance with received changesets or inputs; and Editing-Right Control Module 146 that accesses, verifies, and updates editing-rights of a respective user based on information stored in user information database 114 and/or document database 116.

Application distribution module 222, if present, distributes to clients 120 a set of instructions for displaying a document, receiving inputs from users, and/or updating the document, etc. In some embodiments, the set of instructions is distributed as a web application. In some embodiments, the set of instructions is distributed as an embedded application (which may be based on Java script, Java applet, Ajax, Comet, Active X, or any other programming languages and tool) in a web page. In some embodiments, the set of instructions are distributed as an add-on, plug-in, and/or toolbar for respective browser applications (e.g., 314 in FIG. 3) in clients 120.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Notwithstanding the discrete blocks in FIGS. 1 and 2, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, document database 116 is part of or stored within server 112. In other embodiments, document database 116 is implemented using one or more servers whose primary function is to store and process document information. In some embodiments, document database 116 includes revision database 118, or vice versa. In some embodiments, document database 116 also includes user database 114, or vice versa. In some embodiments, a remote database server includes user database 114, document database 116, and/or revision database 118, at a different physical location from server 112. User database 114, document database 116, and/or revision database 118 can be implemented on one or more servers.

The actual number of servers used to implement a host server system 110 and how features are allocated among them will vary from one implementation to another, and may depend in part on the amount of data traffic that the system must handle during peak usage periods as well as during average usage periods, and may also depend on the amount of data stored by the document management system. Moreover, one or more of the blocks in FIG. 1 may be implemented on one or more servers designed to provide the described functionality. Although the description herein refers to certain features implemented in client 120 and certain features implemented in server 112, the embodiments are not limited to such distinctions. For example, at least some of the features described herein as being part of server 112 can be implemented in whole or in part in client 120, and vice versa.

Figure 3:
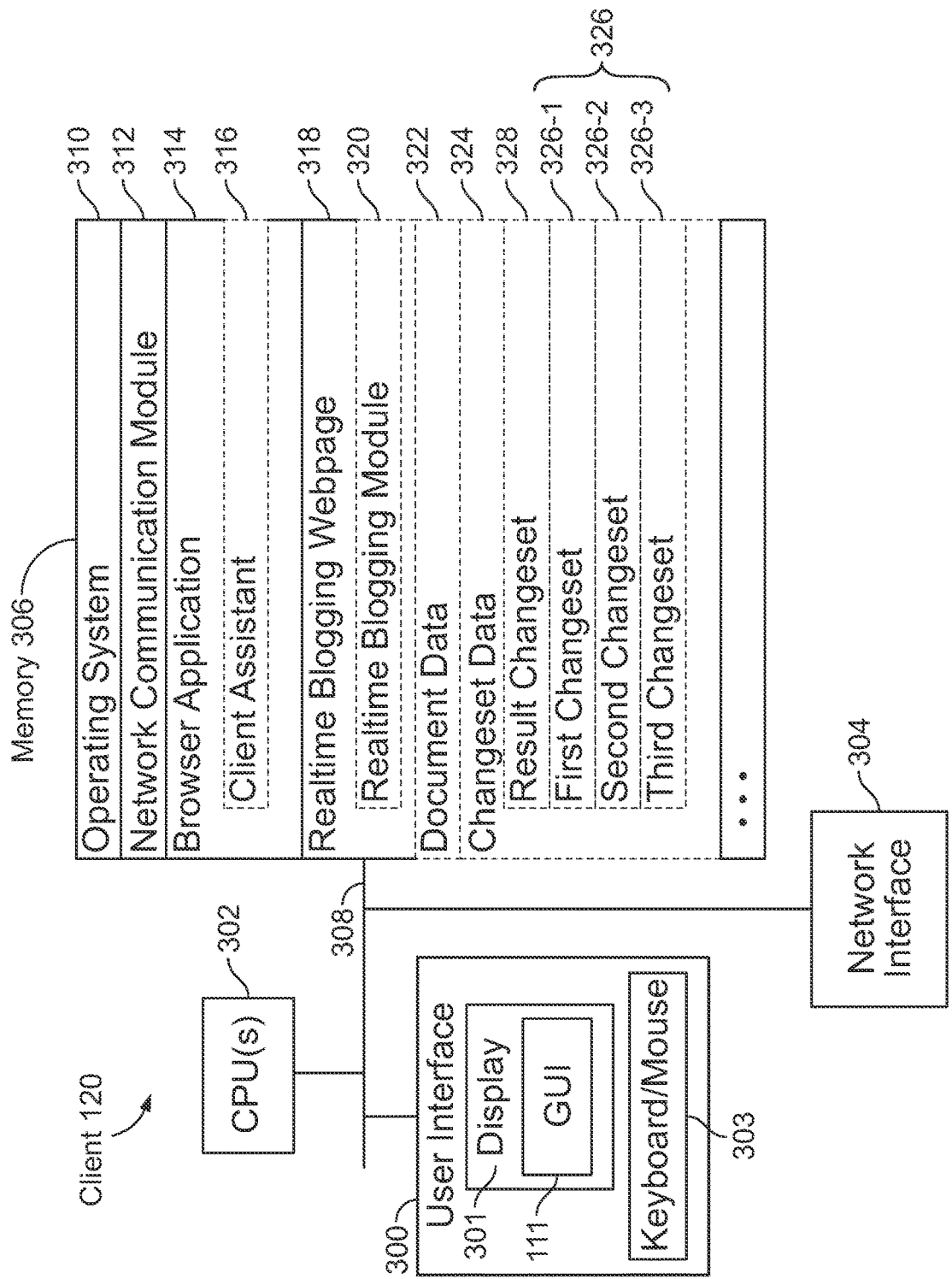
FIG. 3 is a block diagram illustrating a client in accordance with some embodiments.

FIG. 3 is a block diagram illustrating a client, also called client systems or client devices in accordance with some embodiments. Client 120 includes a user interface 300, which typically includes a display device 301, and one or more input devices 303 such as a keyboard and a mouse or other pointing device. As noted above, client 120 includes a graphical user interface (GUI) 111, which is displayed on the display device 301. Client 120 typically includes one or more processing units (CPUs) 302, one or more network or other network communications interfaces 304, memory 306, and one or more communication buses 308 for interconnecting these components. The communication buses 308 may include circuitry (sometimes called a chipset) that interconnects and controls communications between system components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, comprises a non-transitory computer readable storage medium. In some embodiments, memory 306 or the non-transitory computer readable storage medium of memory 306 stores the following programs, modules and data structures, or a subset thereof:

- Operating System 310 that includes procedures for handling various basic system services and for performing hardware dependent tasks;
- Network Communication Module (or instructions) 312 that is used for connecting client 120 to other computers (e.g., host server system 110 and other clients 120) via the one or more communications network interfaces 304 and one or more communication networks 130 (FIG. 1), such as the Internet, other wide area networks, local area networks, metropolitan area networks, and so on;
- Browser Application 314; optionally, the browser application 314 or an extension, plug-in or toolbar of the browser application includes a client assistant 316 that handles data formatting and/or management tasks in providing document editing environment, at least some of which would otherwise be handled by presentation module 220 (FIG. 2);
- Realtime Blogging Webpage 318, which is a webpage received from host server system 110, for displaying at least a portion of a document in GUI 111; realtime blogging webpage 318 may optionally include realtime blogging module 320, which is executable code embedded in webpage 318;
- (optional) Document Data 322, which is a locally stored copy of a respective document for editing and/or display; document data 322, if stored at the client 120, optionally includes metadata concerning the document (e.g., document title, document type, creation date, first author, last update timestamp, location, editing-rights, editing-right-controls, etc.); in some embodiments, document data 322 is included in webpage 318; and
- (optional) Changeset Data 324, which represents revisions/modifications to a document (e.g., stored in document data 322 and/or included in realtime blogging webpage 318); changeset data 324, if included at the client 120, typically includes a first changeset 326-1 and second changeset 326-2; changeset data 324 optionally includes a third changeset 326-3 and/or result changeset 328.

In some embodiments, client 120 includes a plurality of realtime blogging webpages. In some embodiments, client 120 includes a plurality of realtime editing environments. For example, client 120 may include one realtime editing environment for the main text of the blog, and one or more realtime editing environments for comments associated with all or part of the blog. Optionally, these realtime editing environments are displayed together (i.e., concurrently).

In some embodiments, client 120 includes a document editing application (not shown) in addition to, or in lieu of, browser application 314 and realtime blogging webpage 318. In such embodiment, the document editing application includes functions of client assistant 316 and/or realtime blogging module 320, and additional modules necessary to process inputs (e.g., from input devices 303), maintain changesets (e.g., 324), and update document data 322.

In some embodiments, client 120 may be a "thin client," which includes browser application 314 that displays realtime blogging webpage 318 received from host server system 110. In this embodiment, client 120 only displays the realtime blogging webpage, and executes programs, if any, embedded within the realtime blogging webpage 318, but does not include additional software. In some embodiments, programs embedded within the realtime blogging webpage 318 format document data for display. In thin client embodiments, document related processing other than user data input and document display are handled by host server system 110 (e.g., determining a changeset, such as a first changeset and/or a result changeset).

FIG. 4A is a block diagram illustrating an exemplary user information database 114 and an exemplary user record 402-2 in accordance with some embodiments. User information database 114 stores user records 402 (e.g., 402-1 through 402-N, where N represents the number of records).

User record 402 includes the following data for a user, or a subset or superset thereof:

- User ID 410 that uniquely identifies a user of host server system 110;
- User Metadata 412 (e.g., account creation date, date of last log-in, recent activities, pointers to (or document IDs of) recently accessed documents;
- Editing-Right 414 that indicates editing rights of a user (e.g., can read only; read and edit; read, create, and edit documents); in some embodiments, editing-right 414 is document specific (e.g., the user may read and edit a document A, but may read only a document B) or category specific (e.g., the user may read and edit documents in a category A, but may read only documents in a category B);
- Editing-Right Control 416 that indicates rights of a user to control the editing rights of other users;
- User Defined Labels 418 that are used in indicating changes to documents made by the respective user (e.g., a user name, a nickname, an abbreviation of the user's name, other unique text, etc.);
- Client Device ID/Type 420 that represents the type and identifier of a client device (e.g., 120); in some embodiments, client device ID/type 420 may be used to format webpages;
- User Preferences 422 (e.g., display style, document editing preferences (e.g., while editing a document, exclude other editors), etc.);
- User Authentication Information 428 that includes information required to authenticate the user (e.g., password, etc.) and/or includes a status/result of authentication (e.g., authenticated, authentication failed, authentication expired, etc.);
- (optional) User Online Status 426 that indicates the online status of the user (e.g., logged-in, logged-out, typing, reading, away, etc.);
- (optional) IP Address 430 associated with the user; and
- (optional) Email address 430 of the user.

In some embodiments, a respective user may be associated with a plurality of client devices (e.g., a cell phone, a home computer, and a work computer), and user information database 114 may include a respective user record 402 for a respective client device associated with the respective user. Alternatively, user information database 114 may include a respective user record 402 that includes a respective client device ID/type for a respective client device associated with the respective user.

Figure 4B:
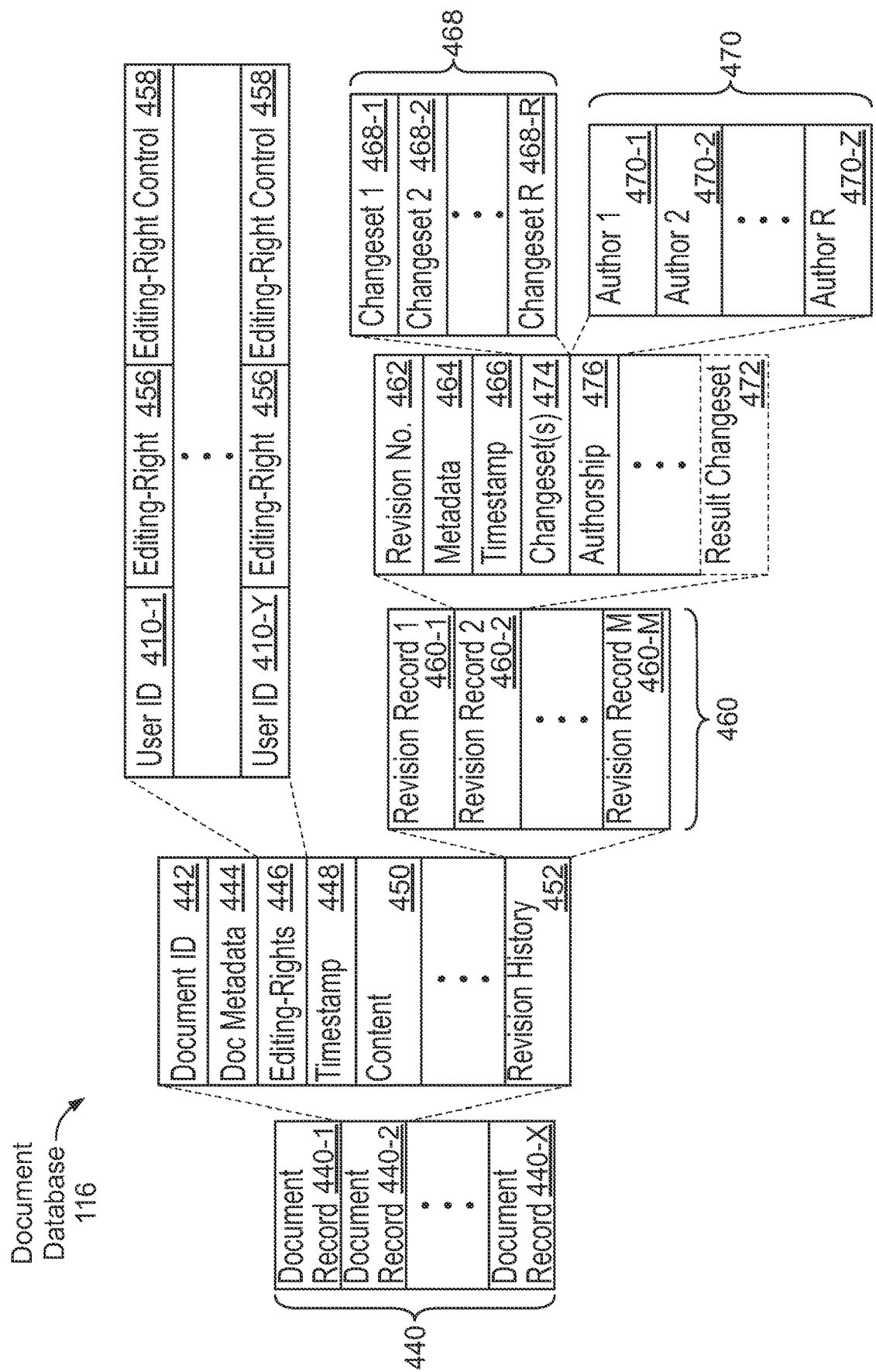
FIG. 4B is a block diagram illustrating exemplary entries in the document database in accordance with some embodiments.

FIG. 4B is a block diagram illustrating an exemplary document database 116 and an exemplary document record 440-2 in accordance with some embodiments. Document database 116 stores document records 440 (e.g., 440-1 through 440-X, where X represents the number of records).

Document record 440 includes the following data for a user, or a subset or superset thereof:

Document ID 442 that uniquely identifies a document stored in host server system 110;

Document metadata 444 (e.g., document title, document type, creation date, first author, last update timestamp, location, etc.);

Editing-rights 446 that indicate, for respective users, editing rights (e.g., 456) and rights to control editing rights of other users (e.g., editing-right controls 458);

Timestamp 448 (e.g., time/date of creation, time/date of last access, time/date of last revision, etc.);

Content 450 (e.g., main text of the document); and

Revision history 452.

Editing-rights 446 indicate whether a corresponding user has an editing-right (e.g., right to edit the corresponding document). In some embodiments, the editing-rights are binary (yes/no or true/false indicating whether the corresponding user may edit the corresponding document. In some embodiments, the editing-rights have multiple levels or a combination of rights, indicating whether the corresponding user may edit certain portions of the document (e.g., a user may post a comment but may not edit the main text) or perform certain types of edits (e.g., a user may add text to the document but may not delete or revise the text). In some embodiments, the editing-rights 446 include access rights (e.g., whether the corresponding user can access/view the corresponding document).

In some embodiments, revision history 452 includes one or more revision records 460 (e.g., 460-1 and 460-2 through 460-M). As illustrated, a respective revision record 460 is created for a respective result changeset (e.g., when a result changeset is created, a revision record is generated). Alternatively, a respective revision record 460 may include revisions/edits made by a respective user and/or revisions/edits made during a given time interval.

In some embodiments, revision record 460 (e.g., 460-2) includes

Revision number 462 that uniquely identifies respective revision record 460;

Revision metadata 464 (e.g., a pointer to the document, a sequence of inputs/changesets received from clients, etc.);

Timestamp 466 that indicates the time when respective revision record 460 was created or updated;

Changeset(s) 474 that include one or more changesets (e.g., changesets 468-1 through 468-R) that are received from clients;

Authorship 476 that indicate one or more users (or authors) 470 (e.g., 470-1 and 470-2 through 470-Z) who edited the document; each of authors 470 may include a user ID (e.g., 410) of the author or a pointer to a user ID; and Result Changeset 472 that is generated in accordance with changesets or inputs from a plurality of clients.

The number of authors in authorship 476 frequently matches the number of changesets in changesets 468 (e.g., each author sends a changeset). However, the number of authors does not need to match the number of changesets. For example, certain changesets may be disregarded for various reasons (e.g., the author did not have an editing-right, the changeset was redundant, etc.). In addition, some authors may send multiple changesets that are captured in a single revision record.

Figure 5:
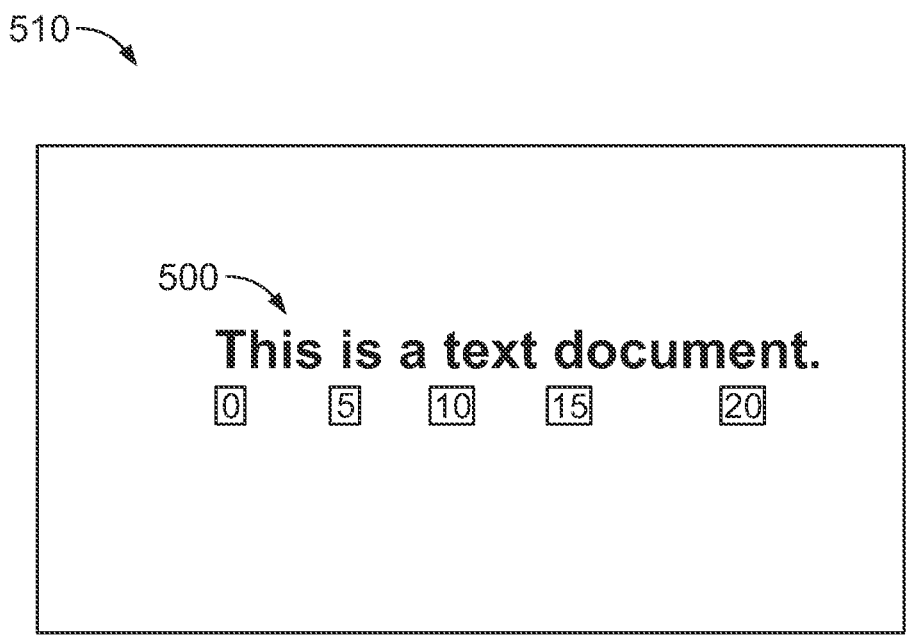
FIG. 5 illustrates an exemplary text document in accordance with some embodiments.

FIG. 5 graphically illustrates a text document 500 as displayed within a window 510 of a display (e.g., 301, FIG. 3) in accordance with some embodiments. Characters in a text document can include letters, numbers, symbols, spaces, and punctuation marks, for example. Each character of the text document 500 has an index starting at, for example a zero (0) index with the first character. Optionally, the text document 500 also is characterized by a length which is defined as the total number of characters. As illustrated, text document 500 has a length of 24. In some embodiments, the index is used in changesets to represent changes to text string(s) and/or text document(s), as described below.

A changeset represents a set of changes to a version of the text document. The changes can include additions and/or deletions of one or more characters to the version of the text document. When a changeset is applied to a particular version of the text document, a new version of the text document can be generated. It will be appreciated, therefore, that any version of a text document can also be represented by an ordered series of changesets, where the first changeset applies to an initial version of the text document. The initial version of the text document can be a blank text document or a pre-existing text document in various instances.

In some embodiments, changesets are canonical, defined herein to mean that a given representation of a document in memory corresponds to only one changeset. Thus, different representations of a document in memory necessarily correspond to different changesets. Being canonical, changesets are therefore comparable. Changesets can also be compact, in some embodiments, meaning that if there is more than one way to represent the changeset in memory, then the one that takes up the least number of bytes will be used.

There are many ways to represent a changeset. In some embodiments, a changeset is represented by the following format:

$$(l \rightarrow l')[c1; c2; c3; \ldots]$$

where l is the length of a version of the text document 500 before the change is applied and l' is the length of the next version of the text document 500 subsequent to the change. The array [c1; c2; c3; ... ] indicates which characters from the prior version are retained, and which characters are being added to the new version. Retained characters are represented by their indices in the prior version of the text document 500 and deleted characters are omitted. New characters are represented as themselves. For instance, if a first version of a text document 500 is "charge" and the subsequent version is "changes" then the changeset would be $$(6 \rightarrow 7)[0, 1, 2, n, 4, 5, s]$$

which can also be represented more compactly as $$(6 \rightarrow 7)[0\text{-}2, n, 4, 5, s].$$

As another example, a changeset to represent the further modification from "changes" to "hangs" would be $$(7 \rightarrow 5)[1\text{-}4, 6].$$

It will be appreciated that each changeset has its own set of indices, starting with zero, such that in the above example the characters at the indices 1-4 in the prior version of the text document map to indices 0-3 in the present changeset, and the character at the prior index 6 maps to the new index 4.

The following example illustrates how a text document can be represented as an ordered series of changesets. In this example, A represents a first changeset applied to an initial (first) blank version of the text document and B represents a second changeset applied to a second version of the text document.

$$A = (0 \rightarrow 5)[H, e, l, l, o]$$

$$B=(5\rightarrow 11)[0\text{-}4, w, o, r, l, d]$$

The third version of this text document is "Hello world" and can be represented as AB. This is referred to herein as the composition of A and B, and changesets are closed under composition, meaning that the result of performing the composition of two changesets always yields another changeset. It will be apparent that the composition AB can be reduced to a single changeset, C, where $C=(0\rightarrow 11)[H, e, l, l, o, w, o, r, l, d]$. In shorthand AB=C. In the following, Q will be used to represent a version of a text document such that QA, QB, etc., represent versions of the text document as modified by the respective changesets A and B.

For realtime document editing, more than one changeset can be applied to the same version of the text document. For instance, two users employing two different client computing systems 120 each make a change to the same version of the text document, Q. The changesets, however, may not be composable, and even if the changesets are composable, the composition might not make sense. As an example, the text document that each user seeks to modify has a length, n, and the two received changesets are $$A=(n\rightarrow n_a)[\ldots n_a \text{ characters}], \text{ and}$$

$$B=(n\rightarrow n_b)[\ldots n_b \text{ characters}]$$

where $n\neq n_a\neq n_b$. If A is applied to the text document, QA, the result has a length $n_a$, and therefore B cannot be further applied to the composition since B requires an initial length of n. Likewise, A cannot be applied to the composition of B with the text document, QB, which would have a length $n_b$, since A also requires an initial length of n.

Merging is a process for computing a single changeset from two changesets, both of which are meant to apply to the same version of a text document. Merging seeks to preserve the intent of both changesets. In some embodiments, a result changeset is called the merge of A and B and is represented as m(A, B).

An exemplary implementation for merging changesets has the following rules designed to preserve the intents of the respective users. Firstly, m(A, B)=m(B, A). A character is retained in m(A, B) if and only if the character is retained in both A and B. Thus, if either changeset deletes a character the intent of the user to delete that character is preserved. The merge m(A, B) includes all characters that are inserted characters in either changeset. Here, the intent of each user to insert characters is preserved. The result is that if both changesets insert the same character at the same location in the text document, the character will appear twice in the subsequent version of the text document.

Additionally, the merge m(A, B) preserves consecutive characters from both changesets. Consecutive inserted characters in a changeset are referred to herein as a run. Typically, runs from different changesets are not comingled, again, preserving the intent of the users to keep runs together. In subsequent changeset examples, runs are placed within quotation marks to designate that the characters are maintained as a run. The merge m(A, B) also preserves the relationships between insertions from either changeset with the retained characters. Accordingly, an insertion of one or more characters between two retained characters in either changeset will remain between the same two retained characters in m(A, B), preserving each user's intent to insert characters at a particular location in the text document.

Where different characters or runs are inserted between the same two retained characters, the insertions from one changeset will necessarily precede the insertions from the other changeset. Here, there needs to be a rule to determine which character or run will precede the other, and although the rule can be arbitrary, the rule should be applied consistently. For example, the rule can specify that the order goes by the alphabetic order of the users. Thus, if one changeset is from a user identified as "bob25" and the other is from a user identified as "tinman," the insertion from bob25 will come first.

Another useful changeset to compute, in the instance where multiple users are editing the same text document, is the changeset that will update a modified version of the text document retained by a client computing system 120. For example, a first user modifies a version of text document Q and a changeset representing the change is A. On the display of the client computing system 120 the first user sees QA. Similarly, a second user modifies the same version of text document Q, a changeset representing the change is B, and on the display of the client computing system 120 the second user sees QB. Although the host code running on the host server system 110 can compute m(A, B) to arrive at a next version of Q, the client computing systems 120 do not need m(A, B) but do need to know how to modify QA or QB in order to arrive at the next version of Q. Accordingly, a changeset designated as a "follows" is computed as illustrated below.

As described in greater detail below, one client computing system 120 sends a changeset A and receives a changeset B while the second client computing system 120 sends B and receives A. In order that both client computing systems 120 are synchronized such that both continue to display the same text document, Q composed with m(A, B), then $$QAB'=QBA'=Qm(A, B)$$

where A' and B' are the follows changesets. In the following discussion A' can also be represented as f(B, A) and B' can be represented as f(A, B) and therefore $$Af(A, B)=Bf(B, A)=m(A, B)=m(B, A).$$

As was the case with merges, follows are computed through the application of rules, and there are many possible rule sets that can be employed. An exemplary set of rules for computing follows changesets includes three rules. For a follows f(A, B), the first rule is that insertions in A become retained characters in f(A, B). As a second rule, insertions in B are considered inserted characters in f(A, B). Lastly, characters that are retained in both A and B are retained in f(A, B).

As an example, a version of text document Q is "baseball." A first user changes "baseball" to "basil" by replacing "sebal" with "si" while a second user changes "baseball" to "below" by deleting "as," "ba," and replacing the final "l" with "ow." Accordingly, $$Q=(0\rightarrow 8)[b, a, s, e, b, a, l, l];$$

$$A=(8\rightarrow 5)[0, 1, l, \text{``}si\text{''}, 7];$$

$$B=(8\rightarrow 5)[0, e, 6, \text{``}ow\text{''}];$$

$$m(A, B)=(8\rightarrow 6)[0, e, \text{``}si\text{''}, \text{``}ow\text{''}]=(8\rightarrow 6)[0, \text{``}esiow\text{''}];$$

$$B'=f(A, B)=(5\rightarrow 6)[0, e, 2, 3, \text{``}ow\text{''}]; \text{ and}$$

$$A'=f(B, A)=(5\rightarrow 6)[0, 1, \text{``}si\text{''}, 3, 4].$$

It can be seen that $AB'=BA'=m(A, B)=(8\rightarrow 6)[0, \text{``esiow''}]$.

Returning to the operation of the client computing system 120 while executing the client code, in some embodiments the client computing system 120 maintains three changesets, A, X, and Y as variables in memory where A represents a current version of the text document including those changesets sent to, and acknowledged by, the host server system 110 (while executing the host code); X represents any changes submitted to the host server system 110 that have not yet been acknowledged by the host server system 110 (e.g., 326-1, FIG. 3); and Y represents changes that have not yet submitted to the host server system 110 (e.g., 326-2, FIG. 3). The composition of A, X, and Y yields the local text document, Local Text Document=$AXY$.

The client computing system 120 also maintains, in some embodiments, a window, W, which represents that portion of the local text document actually provided to the display of the client computing system 120 to be viewed by the user. Maintaining the window is not essential, as the local text document can always be determined from A, X, and Y and a portion of the local text document can then be selected and displayed, but maintaining the window provides greater efficiency when working with larger text documents.

In some embodiments, the client code running on a client computing system 120 is configured to perform five operations for keeping the local text document current in view of changes made by the user of the client computing system 120 and in view of the changes made at other client computing systems 120. A first operation is to connect to the host server system 110 and establish the local text document. A second operation is to allow changes to be made locally to the local text document. A third operation is to send locally made changes to the host server system. A fourth operation is to receive an acknowledgement of the changes from the host server system and update A and X. A fifth operation is to receive, from the host server system 110, a changeset from another client computing system 120 and modify A, X, and Y accordingly.

In the first operation the client (operating under the control of the client code) connects to the host server system 110 and establishes the local text document. The client can connect to the host server system 110, for example, by specifying the appropriate URL for the host server system 110. Connecting to the host server system 110 may further comprise providing a browser cookie to the host server system 110 where the browser cookie specifies a unique ID for the client computing system 120. If no such cookie exists, then connecting to the host server system 110 alternatively further comprises assigning a unique ID to the client computing system 120 and storing the unique ID in a browser cookie.

Assigning the unique ID can be performed in a number of ways. For example, in different embodiments either the client computing system 120 (operating under control of the client code) or the host server system 110 (operating under control of the host code) generates the unique ID. An exemplary unique ID is a string generated from the IP address of the client computing system 120, the current timestamp number, and a random number, such as "18.4.234.1.9837459873.2345878927349." In other embodiments the client computing system 120 or the host selects the unique ID from a large number of pre-defined unique IDs.

As noted, the first operation also comprises establishing the local text document. Establishing the local text document can comprise setting initial values for A, X, and Y. For A, the client computing system 120 receives from the host server system 110 the current version of the text document, referred to herein as HEADTEXT, while X and Y are set to the identity, such that $A=(0 \rightarrow N)[<\text{original text}>]$;

$X=(N \rightarrow N)[0, 1, 2, \ldots N-1]$; and $Y=(N \rightarrow N)[0, 1, 2, \ldots N-1]$.

It can be seen that the identity (denoted hereafter as $I_N$), when composed with another changeset, does not modify the other changeset.

In some embodiments, the first operation further comprises establishing and displaying a window, W. Where the length of A exceeds a maximum length for W, establishing W can comprise assigning the indices of A to W, starting at zero, until the maximum length is reached.

The second operation allows changes to be made locally to the local text document. Here, a user makes an edit, E, through an input device of the client computing device 120, and the client computing system 120 updates Y by computing the composition of YE. Updating Y can also be represented as $Y \leftarrow YE$ where "$\leftarrow$" means assignment, as in Y is a variable in memory holding the local unsubmitted changes and is assigned a new value YE. In those embodiments where W is employed, the second operation also comprises updating W:

$W \leftarrow WE$.

In other embodiments, the client computing system 120 computes the composition of AXY with the updated Y and redisplays the result.

The third operation comprises sending locally made changes, Y, to the host server system 110. The third operation includes three tasks. The first task of this operation is to communicate Y to the host server system 110. Here, Y is sent to the host server system 110 together with the unique ID. The second task is to assign Y to X, $X \leftarrow Y$ and the third task is to reassign the identity to Y $Y \leftarrow I_N$.

In an exemplary embodiment, the client computing system 120 performs the third operation every 500 ms. As used herein, 500 ms is the exemplary threshold of realtime editing. In some embodiments, the client computing system 120 communicates Y to the host server system 110 more frequently than every 500 ms, for example, every 450 ms, every 400 ms, every 350 ms, every 300 ms, every 250 ms, every 200 ms, every 150 ms, every 100 ms, or every 50 ms. Less frequently than 500 ms, and the delays in synchronization start to become perceptible. In some embodiments, if 500 ms elapses without receiving an acknowledgement from the host server system 110, this third operation does not repeat until after such acknowledgement is received. Also, in some instances, the third operation is not performed if Y is the identity, signifying that no edits have been made during the interval.

In the fourth operation the client computing system 120 receives an acknowledgement from the host server system 110 and in response updates both A and X. To update A, the client computing system 120 composes AX and assigns the composition to A $A \leftarrow AX$.

To update X, the client computing system 120 assigns the identity to X $$X \leftarrow I_N.$$

Since the identity is not assigned to X until after the acknowledgement is received and A has been updated, no edits are lost. It will be appreciated that even if there is a delay in communication with the host server system 110 due to a slow connection, for example, the client computing system 120 (under the control of the client code) allows the user to continue editing the local copy of the text document.

The fifth operation is to receive a changeset, B, from another client computing system 120 and to modify A, X, and Y accordingly. A, X, and Y are modified by assigning the following:

$$A \leftarrow AB;$$

$$X \rightarrow f(B, X); \text{ and}$$

$$Y \leftarrow f(f(X, B), Y).$$

In some embodiments, W is also modified as part of the fifth operation. Here, a changeset, D, that can be applied to W is determined such that $$W \leftarrow WD$$

where, $$D = f(Y, f(X, B)).$$

The host code running on the host server system 110 also performs a number of operations. In some embodiments, the host server system 110 (while executing the host code) maintains an ordered list of revision records, where a revision record is a data structure that comprises a changeset and authorship information. An exemplary revision is as follows:

{changeset, unique ID, revision number} where the unique ID identifies the client computing system 120 associated with the changeset and the revision number is assigned sequentially. By convention, the first revision number is zero, in some embodiments. Optionally, the host server system 110 also maintains the HEADTEXT and updates this variable with each successive revision record. In the alternative, the HEADTEXT can be computed as needed by composing in order the changesets embodied in the revision records.

As noted above with respect to the client computing systems 120, each client computing system 120 connects to the host server system 110 and establishes a local text document. On the other side, the host server system 110 accepts the connection, updates a list of connected client computing systems 120 with the unique ID for the connecting client computing system 120, sends the HEADTEXT to the connecting client computing system 120, and associates the revision number of the sent HEADTEXT with the unique ID. In some embodiments, the revision number is also sent with the HEADTEXT and maintained in parallel by the client computing system 120. The host server system 110 can also, in some embodiments, store additional information in association with each unique ID, such as a screen name of the user which can be obtained at the time that the client computing system 120 connects to the host server system 110.

When the host server system 110 receives a changeset, C, from a client computing system 120, the host server system 110 updates the other connected client computing systems 120 and stores a new revision record. In order to perform these tasks, the host server system 110 first associates C with the revision number, $r_c$, for the sending client computing system 120 latest revision. In some embodiments, the client computing system 120 transmits the revision number with the changeset, while in other embodiments the host server system 110 keeps track of the revision number for each client computing system 120 as the revision number advances with each update. In still further embodiments the client computing system 120 transmits the revision number and the host server system 110 also tracks the revision number, which should agree, for redundancy and error checking.

Next, the host server system 110 computes a follows changeset C' relative to the most current version of the text document held by the host server system 110, where the most current revision number is designated $r_h$, where the subscript stands for HEADTEXT. The host server system 110 computes C' for revision $r_h$ by computing the follows $f(Qr_{c+1}, C)$ where $Qr_{c+1}$ designates the next sequential version of the text document, and then repeating for each successive version until the most current version is reached. The final follows, C', is then transmitted to each of the client computing systems 120 except for the originating client computing system 120, optionally with the next revision number. The host server system 110 sends an acknowledgement to the originating client computing system 120. Lastly, the host server system 110 creates a new revision record from C', the new revision number, and the unique ID for the originating client computing system 120, and adds the new revision record to the revision record list.

FIG. 6 illustrates an exemplary realtime blog entry (e.g., webpage 318) displayed on a client computing system 120 of a user in accordance with some embodiments. As illustrated, the exemplary blog entry includes content as may be generated by a blogger reporting a live event. To illustrate the realtime nature of this content a timestamp 605 is placed at the start of each new paragraph. Typically, each of the characters shown is provided to the client on a character by character basis or a word by word basis in realtime as they were received from the master editor. The characters or words can be provided as changesets as discussed elsewhere herein. The content is displayed in a main field 610 and can include text as well as other objects such as an image 615.

New content is added to the bottom 620 of the blog in realtime as indicated by the timestamps. If the master editor (a user with editing-rights and editing-right control), or a junior editor (a user with editing-rights but not with editing-right control) makes changes to previously provided content, then these changes are optionally marked. For example, the markings 625 show that the word "comes" is inserted and the word "ovation" is corrected. In some embodiments, the markings have a distinct color, compared to the remainder of the content.

The exemplary blog entry of FIG. 6 includes several comments 625A-625C. These comments are optionally associated with specific objects within the blog entry (e.g., a specific word, sentence, paragraph, image, etc.). For example, the comment 625A is associated with the word "those" and the comment 625B is associated with the image 615. A comment may also be associated with another comment. The comment 625C is a comment on a comment and is associated with the comment 625B. A series of comments can be associated with each other to form a thread of comments. In some embodiments, associated comments are visually identified with objects (e.g., one or more words, one or more sentences, a portion of the content, another comment, or a portion of another comment) that the comments are associated with. For example, the word "those" associated with the comment 625A is visually distinguished (e.g., by a highlight or by a box around the word), and the association of the word "those" and the comment 625A is visually identified by a connecting line. Similarly, the association between the comment 625B and the comment 625C is visually identified by a connecting line.

In some embodiments, the comments are realtime documents themselves whose content is displayed to multiple users in realtime as it is received by the multiple users. Comments may have similar characteristics as the blog entry displayed in the main field 610. Accordingly, in some embodiments, comments can be edited by one or more editors and/or associated with other comments. In some embodiments, comments inherit characteristics from the objects with which they are associated (e.g., comments may have same colors, same fonts, same size, same background color, same highlighting color, etc. as the objects with which they are associated). In some embodiments, when content is added to the blog entry and one or more comments are also added at the same time, this content and/or comments are provided as one or more changeset to other users in realtime.

The exemplary blog entry illustrated in FIG. 6 further includes several optional user interface objects, e.g., buttons displayed on a graphical user interface. These include a save button 630 configured for a master editor, junior editor or other user to save the current blog in static memory. In some embodiments, activation of the save button by an editor initiates sending a message to host server system 110 such that the current state of a realtime blog is copied to memory (e.g., 206 or 306).

A lock button 635 is configured to change a realtime blog to a static blog. When activated by a user on a client 120, the lock button may be used to prevent changes to the blog until the user has a chance to review the content. The user can then use a live button 640 to unlock the blog, making the blog realtime again. The user is then shown changes to the blog that occurred while the blog was locked. The user can convert a static blog to a realtime blog using the live button 640. An editor may use the lock button 635 to temporarily halt live updates to the blog. This allows the editor to make a set of modifications, which are later used to update the blog once the live button 640 is activated.

A comment button 645 is configured for an editor or other user to attach a comment to the blog. The attached comment is optionally associated with a particular part, e.g., text or object, within the blog or within a previously existing comment. In some embodiments, editor(s) and/or other user(s) are allowed to use the control elements illustrated in FIG. 6.

Figure 7:
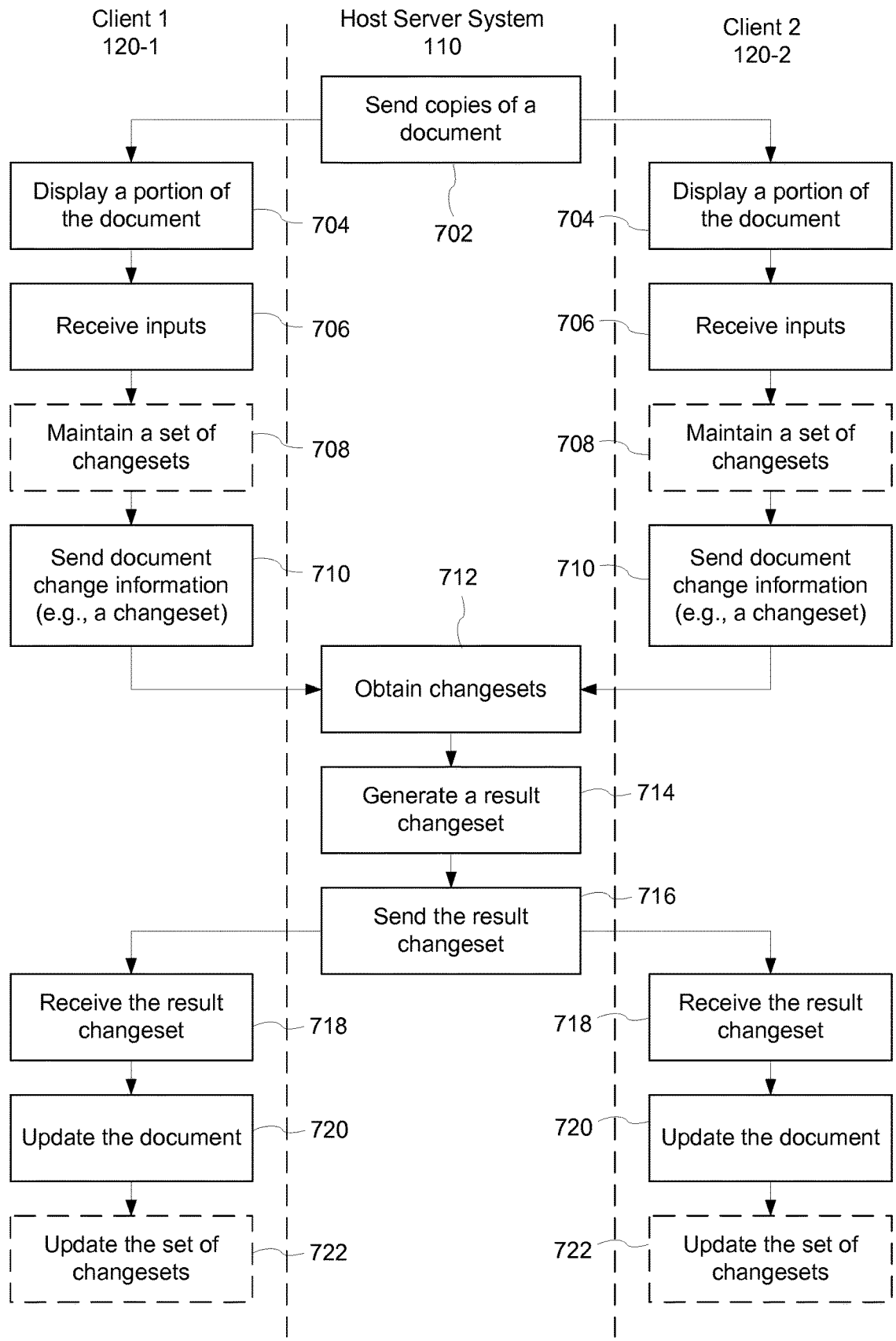
FIG. 7 is a high-level flow diagram illustrating processes performed by clients and a document management system in accordance with some embodiments.

FIG. 7 is a high-level flow diagram illustrating processes performed by clients and a document management system in accordance with some embodiments. It will be appreciated by those of ordinary skill in the art that one or more of the acts described may be performed by hardware, software, or a combination thereof, as may be embodied in one or more computing systems. In some embodiments, portions of the operations performed by the host server system 110 can be performed by client 120.

In FIG. 7, a respective client 120 (e.g., 120-1 or 120-2) is a computer or other device used by a user. The host server system 110 sends (702) copies of a document to a plurality of clients (e.g., clients 120-1 and 120-2). In some embodiments, the plurality of clients 120 first send requests for viewing and/or editing of the document, and the host server system 110 responds by sending copies of the document to the plurality of clients 120.

The respective client 120 displays (704) a portion of the document, and receives (706) inputs from a respective user. Optionally, the respective client 120 maintains (708) a set of changesets (e.g., 468, FIG. 4B). The set of changesets represents changes to the document. The respective client 120 sends (710) document change information (e.g., inputs, such as keystrokes, or a changeset determined based on the inputs) to the host server system 110.

The host server system 110 obtains (712) changesets, for example by receiving the changeset from respective clients 120, or by generating a changeset based on the inputs received from respective clients 120. The host server system 110 generates (714) a result changeset based on the obtained changeset(s), and sends (716) the result changeset to the plurality of clients (e.g., 120-1 and 120-2). This allows the host server system 110 to transmit changes by the client 120-1 to the client 120-2, and vice versa.

The respective client 120 receives (718) the result changeset, and updates (720) the document or the copy of the document stored at the respective client 120. Optionally, the respective client 120 updates (722) the set of changesets maintained at the respective client 120.

Figure 8A:
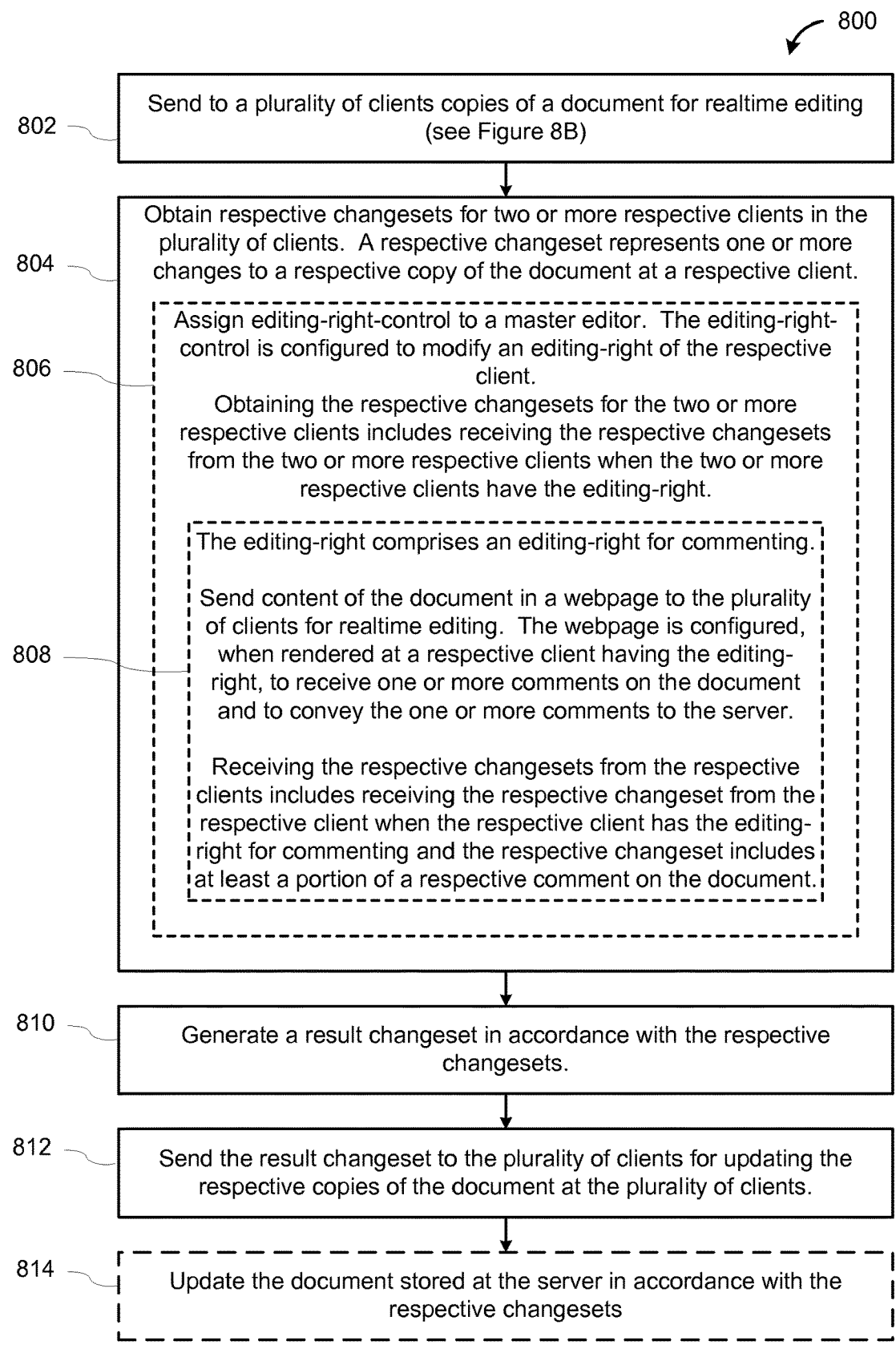
FIGS. 8A and 8B are flowcharts representing a method of providing a document to a plurality of clients for realtime editing in accordance with some embodiments.
Figure 8B:
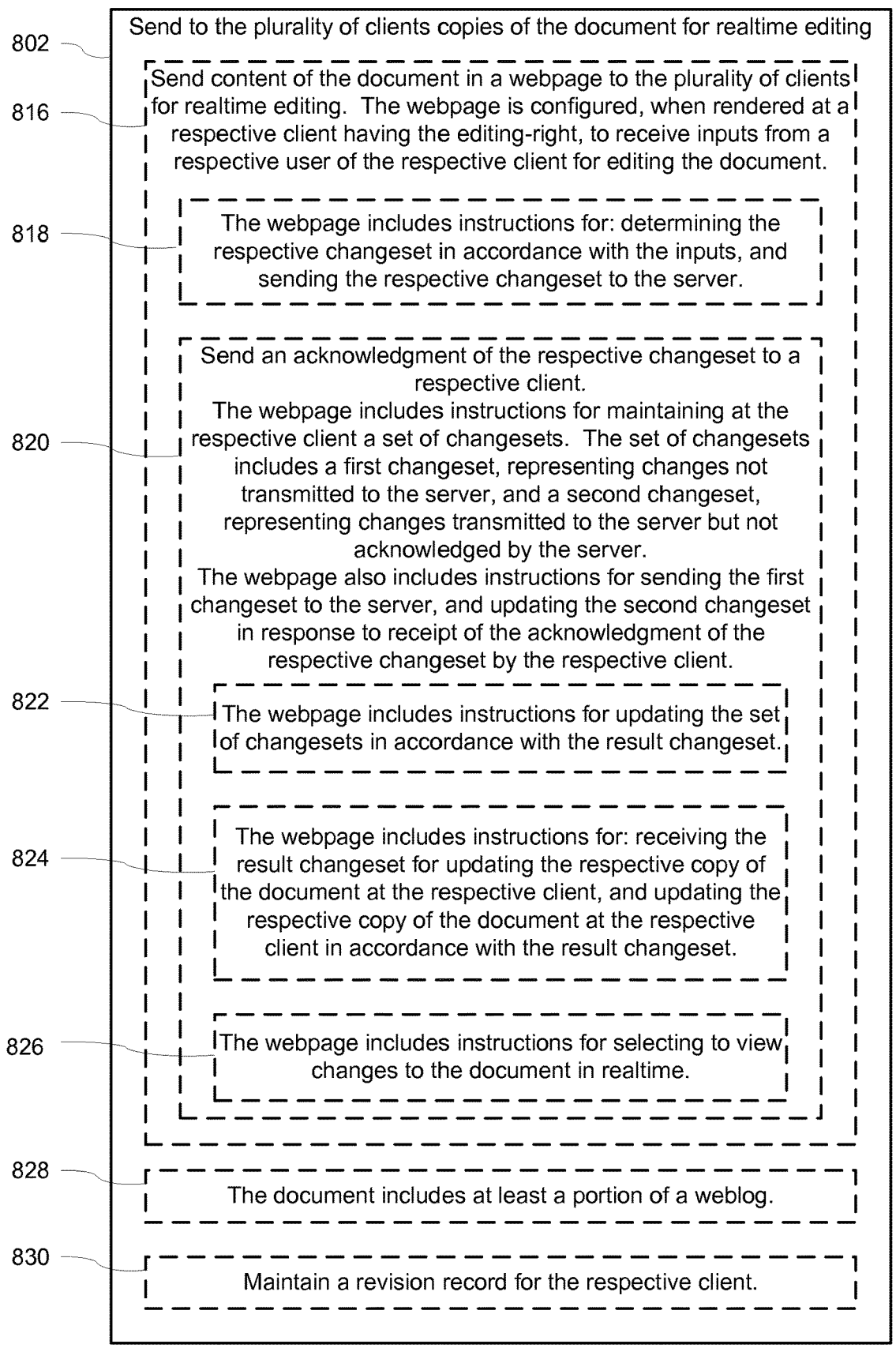

FIGS. 8A and 8B are flowcharts representing a method of providing a document to a plurality of clients for realtime editing in accordance with some embodiments. In certain embodiments, the host server system 110 includes a server having one or more processors and memory storing one or more programs for execution by the one or more processors.

The server sends (802) to the plurality of clients copies of the document for realtime editing. For example, the server sends respective copies of the document from document database 116 (e.g., a respective copy including a portion of content 450) to respective clients (e.g., 120) using realtime blogging—client interface program 216. In some embodiments, as a result, respective clients receive the respective copies of the document and store the received copies (e.g., 322, FIG. 3).

In some embodiments, prior to sending copies of the document, the server sends a browser add-on to the plurality of clients 120. The browser add-on includes instructions for receiving one or more changesets, updating respective copies of the document based on the received changesets, and displaying the updated respective copies of the document. A respective copy of the browser add-on is executed in association with respective browser applications 314 at respective clients 120.

In some embodiments, the server sends (816) content of the document in a webpage to the plurality of clients for realtime editing. The webpage is configured, when rendered at a respective client having the editing-right, to receive inputs from a respective user of the respective client for editing the document.

In some embodiments, the webpage includes instructions for receiving inputs from the respective user of the respective client for editing the document. In some embodiments, the webpage includes instructions for sending the inputs to the server. In some embodiments, the instructions are prepared and/or embedded into the webpage using application distribution module 222.

In some embodiments, the webpage includes instructions for automatically updating the webpage (e.g., in accordance with a received result changeset).

In some embodiments, the server generates respective changeset for respective client in accordance with the inputs sent by the respective clients (e.g., the server generates the respective changesets in accordance with respective keyboard strokes sent by the respective clients). For example, inputs include keyboard strokes, a stream of characters, or the like. In some embodiments, the inputs include voice-inputs which are converted to text through voice recognition.

In some embodiments, the webpage includes (818) instructions (e.g., realtime blogging module 320, FIG. 3) for: determining the respective changeset in accordance with the inputs; and sending the respective changeset to the server. In some embodiments, a respective client sends the respective changeset to the server at a predefined time interval, after a predefined number of characters or words, in response to a request from a server to send the respective changeset, in response to an input from a user (e.g., when a user presses a key), or any combination thereof.

In some embodiments, the server sends (820) an acknowledgment of the respective changeset to a respective client. The webpage includes instructions for maintaining at the respective client a set of changesets. The set of changesets comprises: a first changeset (e.g., 326-1), representing changes not transmitted to the server; and a second changeset (e.g., 326-2), representing changes transmitted to the server but not acknowledged by the server. The webpage also includes instructions for sending the first changeset to the server; and instructions for updating the second changeset in response to receipt of the acknowledgment of the respective changeset by the respective client. In some embodiments, when the respective client receives the acknowledgement from the server, the respective client updates the first and second changesets.

In some embodiments, the set of changesets maintained at the respective client further comprises a third changeset (e.g., 326-3), representing changes transmitted to and acknowledged by the server.

In some embodiments, the webpage includes (822) instructions for updating the set of changesets in accordance with the result changeset. For example, realtime blogging module 320 may include instructions for updating the set of changesets (e.g., 326-1, 326-2, and/or 326-3) in accordance with the result changeset (e.g., 328), as described above with reference to FIG. 5.

In some embodiments, the webpage includes (824) instructions for: receiving the result changeset for updating the respective copy of the document at the respective client; and updating the respective copy of the document at the respective client in accordance with the result changeset (e.g., realtime blogging module 320).

In some embodiments, the webpage includes (826) instructions for selecting to view changes to the document in realtime. In some embodiments, the instructions for selecting to view changes to the document in realtime display are associated with a user interface object (e.g., live button 640, FIG. 6) on the webpage. When the webpage is switched from a static state to a live state, one or more changesets are optionally provided to the client. These changesets represent any differences between the viewed static state and a current state of the blog. In some embodiments, the webpage is updated using these changesets based on the user selection.

In some embodiments, the document includes (828) at least a portion of a weblog (e.g., see FIG. 6). In some embodiments, the document includes instructions for receiving comments and changes to the comments. In some embodiments a changeset can include changes to one or more comments. This allows the server to receive a comment from one of the plurality of clients, and send the comment to other members of the plurality of clients for display in realtime on a character by character or word by word basis.

In some embodiments, the server maintains (830) a revision record for the respective client (e.g., revision record 460 in document database 116, FIG. 4B).

The server obtains (804) respective changesets for two or more respective clients in the plurality of clients. A respective changeset (e.g., 468) represents one or more changes to a respective copy of the document at a respective client. In some embodiments, the server obtains respective changesets 326 from one or more clients 120 (e.g., the server receives respective changesets 326 stored at the one or more clients using receiving module 142). In some embodiments, obtaining respective changesets includes receiving respective first changesets (e.g., 326-1) from the two or more respective clients. In some embodiments, the server determines respective changesets based at least in part on information (e.g., keyboard strokes, etc.) received from one or more clients.

In some embodiments, the server assigns (806) editing-right-control to a master editor. The editing-right-control is configured to modify an editing-right of the respective client. For example, the server updates editing-right control 416 in user info database 114 using editing-right-control module 146 to indicate that a respective client associated with a respective user has editing-right control (e.g., the respective user is a master editor). For example, the editing-right control allows the master editor to modify the blog, to grant other users permission to edit and/or comment on the blog, and/or to allow comments associated with the blog. In some embodiments, assigning editing-right-control includes authenticating a respective user (e.g., using a password or similar access control mechanism). Obtaining the respective changesets for the two or more respective clients includes receiving the respective changesets from the two or more respective clients when the two or more respective clients have the editing-right. In some embodiments, the server disregards respective changesets sent by respective clients that do not have the editing-right.

In turn, the respective client associated with the master editor may modify (e.g., grant and/or remove) an editing-right of one or more clients.

In some embodiments, the editing-right comprises (808) an editing-right for commenting. The server sends content of the document in a webpage to the plurality of clients for realtime editing. The webpage is configured, when rendered at a respective client having the editing-right, to receive one or more comments on the document and to convey the one or more comments to the server. Receiving the respective changeset from the respective client includes receiving the respective changeset from the respective client when the respective client has the editing-right for commenting and the respective changeset includes at least a portion of a respective comment on the document. When the respective comment is included in the result changeset, the respective comment is displayed as part of the webpage 318 (e.g., comments 625A-625C, FIG. 6).

The server generates (810) a result changeset in accordance with the respective changesets. In some embodiments, the result changeset is a merge of the respective changesets for the respective clients, as described above with reference to FIG. 5. In some embodiments, generating the result changeset includes generating the result changeset in accordance with respective changesets obtained after generating a previous result changeset. In some embodiments, generating the result changeset includes generating the result changeset in accordance with respective changesets obtained within a predefined time period.

The server sends (812) the result changeset to the plurality of clients for updating the respective copies of the document at the plurality of clients. For example, the server sends the result changeset in document database 116 using realtime blogging-client interface program 216, and the client receives and stores the result changeset (e.g., 328, FIG. 3). In some embodiments, the client updates the document stored at the client using the result changeset.

In some embodiments, the server updates (814) the document stored at the server in accordance with the respective changesets. Updating the document stored at the server may be performed using realtime blogging application 140, or more specifically changeset module 144, in a manner described above with reference to FIG. 5.

Note that details of the processes described above with respect to method 800 are also applicable in an analogous manner to the methods described below, including methods 900 and 1000. For brevity, these details are not repeated below.

Figure 9:
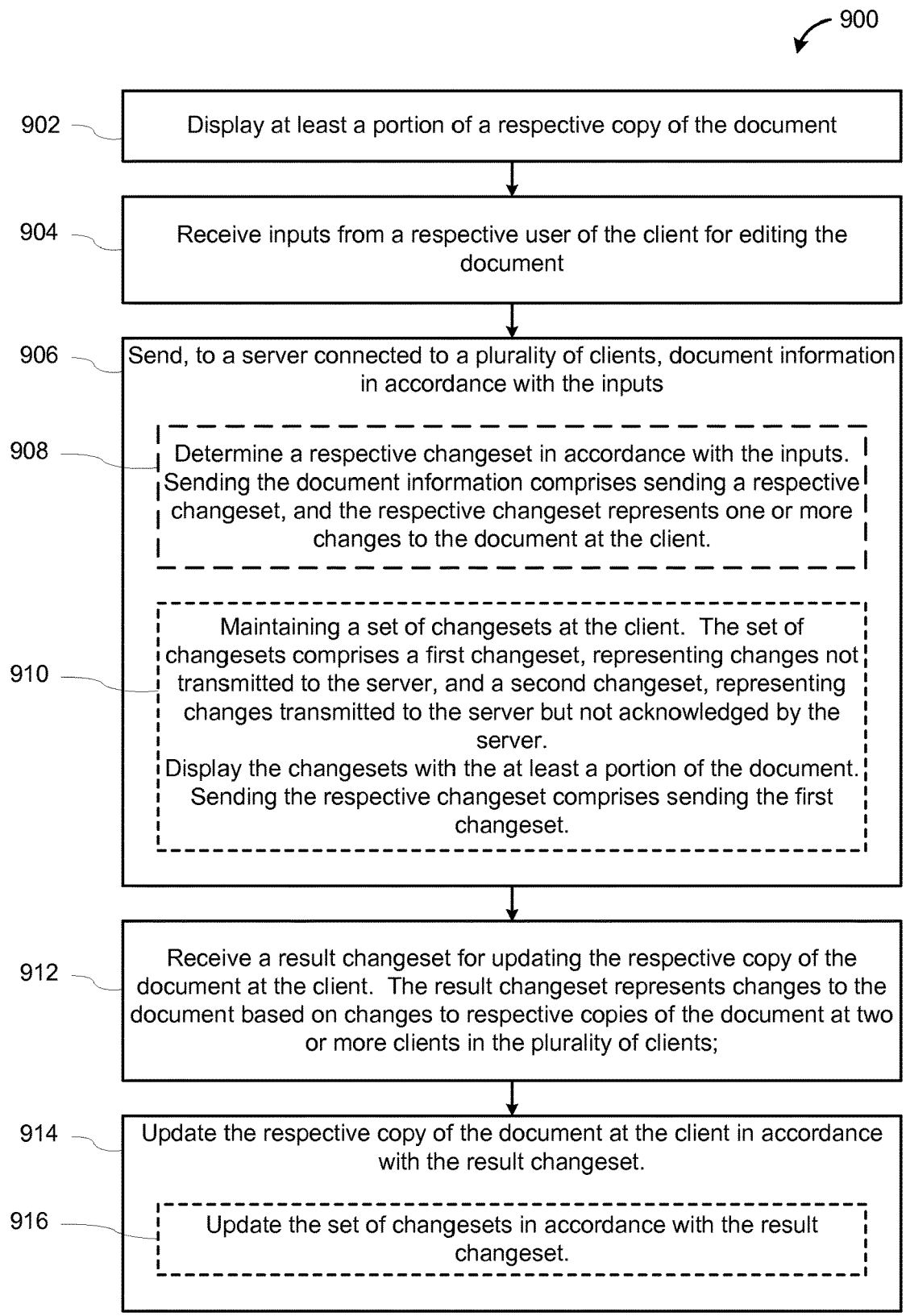
FIG. 9 is a flowchart representing a method of processing a document for realtime editing performed at a client in accordance with some embodiments.

FIG. 9 is a flowchart representing a method of processing a document for realtime editing performed at a client in accordance with some embodiments. In certain embodiments, the method is performed at a client having one or more processors and memory storing one or more programs for execution by the one or more processors to perform the method (e.g., client 120, FIG. 3).

The client displays (902) at least a portion of a respective copy of the document.

The client receives (904) inputs from a respective user of the client for editing the document (e.g., keyboard strokes, etc.).

The client sends (906), to a server connected to a plurality of clients, document information in accordance with the inputs. In some embodiments, the client sends the document information to the server at a predefined time interval, after a predefined number of characters or words, in response to a request from a server, in response to an input from a user (e.g., when a user presses a key), or any combination thereof.

In some embodiments, sending the document information comprises sending the inputs to a server (e.g., the client sends the keyboard strokes to the server).

In some embodiments, the client determines (908) a respective changeset in accordance with the inputs. The respective changeset represents one or more changes to the document at the client. Sending the document information comprises sending a respective changeset (e.g., 326, FIG. 3).

In some embodiments, the client maintains (910) a set of changesets at the client. The set of changesets comprises: a first changeset (e.g., 326-1), representing changes not transmitted to the server; and a second changeset (e.g., 326-2), representing changes transmitted to the server but not acknowledged by the server. The client displays the changesets with the at least a portion of the document. Sending the respective changeset comprises sending the first changeset (e.g., 326-1).

In some embodiments, the set of changesets further comprises a third changeset (e.g., 326-3), representing changes transmitted to and acknowledged by the server.

In some embodiments, the client displays a subset of changes represented in the set of changesets. For example, some of the changes represented in the set of changesets may not be displayed as the areas of the changes are outside the displayed portion of the document.

The client receives (912) a result changeset (e.g., 328) for updating the respective copy of the document at the client. The result changeset represents changes to the document based on changes to respective copies of the document at two or more clients in the plurality of clients. In some embodiments, the result changeset represents changes include changes to a respective copy of the document at the client.

The client updates (914) the respective copy of the document at the client in accordance with the result changeset, in a manner described above with reference to FIG. 5.

In some embodiments, the client updates (916) the set of changesets in accordance with the result changeset, in a manner described above with reference to FIG. 5. In some embodiments, changes in the first changeset that are already reflected in the result changeset may be deleted in order to prevent redundant changes.

Figure 10:
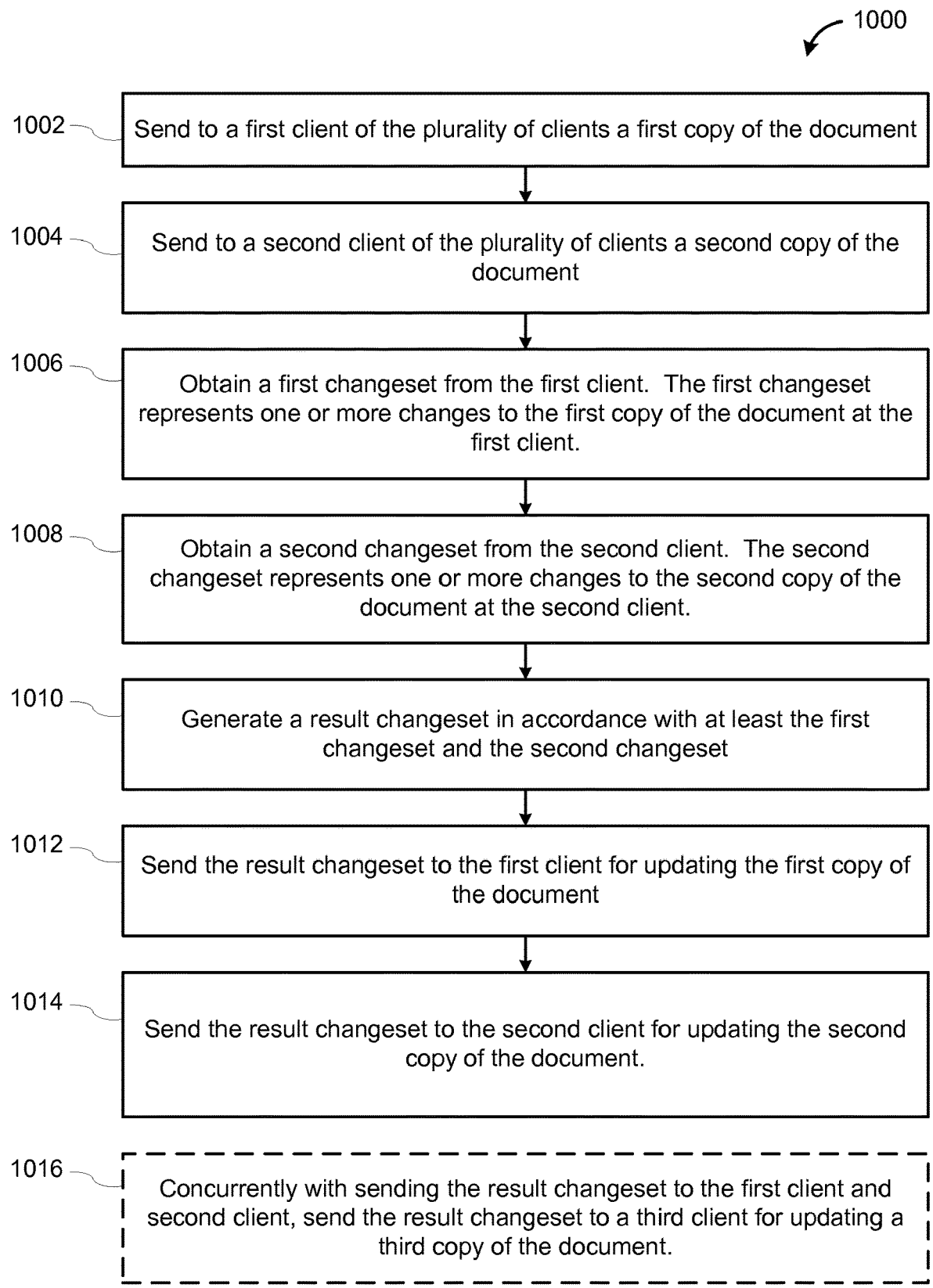
FIG. 10 is a flowchart representing a method of providing a document to a plurality of clients for realtime editing in accordance with some embodiments.

FIG. 10 is a flowchart representing a method of providing a document to a plurality of clients for realtime editing in accordance with some embodiments. In some embodiments, the method is performed at the host server system 110. In certain embodiments, the host server system 110 includes a server having one or more processors and memory storing one or more programs for execution by the one or more processors.

The server sends (1002) to a first client of the plurality of clients a first copy of the document (e.g., operation 702 to client 120-1, FIG. 7).

The server sends (1004) to a second client of the plurality of clients a second copy of the document (e.g., operation 702 to client 120-2, FIG. 7).

The server obtains (1006) a first changeset from the first client (e.g., operation 712 in association with client 120-1, FIG. 7). The first changeset represents one or more changes to the first copy of the document at the first client (e.g., changeset 326-1 at client 120-1).

The server obtains (1008) a second changeset from the second client (e.g., operation 712 in association with client 120-1, FIG. 7). The second changeset represents one or more changes to the second copy of the document at the second client (e.g., changeset 326-1 at client 120-2).

The server generates (1010) a result changeset in accordance with at least the first changeset and the second changeset (e.g., changesets 326-1 from both clients 120-1 and 120-2).

The server sends (1012) the result changeset to the first client for updating the first copy of the document (e.g., operation 716 to client 120-1, FIG. 7).

The server sends (1014) the result changeset to the second client for updating the second copy of the document (e.g., operation 716 to client 120-2, FIG. 7).

In some embodiments, the server sends (1016) the result changeset to a third client for updating a third copy of the document, concurrently with sending the result changeset to the first client and second client.

FIGS. 11-14 describe various methods of the invention in accordance with some embodiments. In some embodiments, the methods and/or operations illustrated in FIGS. 11-14 are used in methods described above, including methods 800, 900, and 1000. In addition, in some embodiments, the methods and/or operations illustrated in FIGS. 11-14 may complement the methods and operations described above. For example, method 900 described above with reference to FIG. 9 may include one or more operations in method 1400 described below with reference to FIG. 12.

Figure 11:
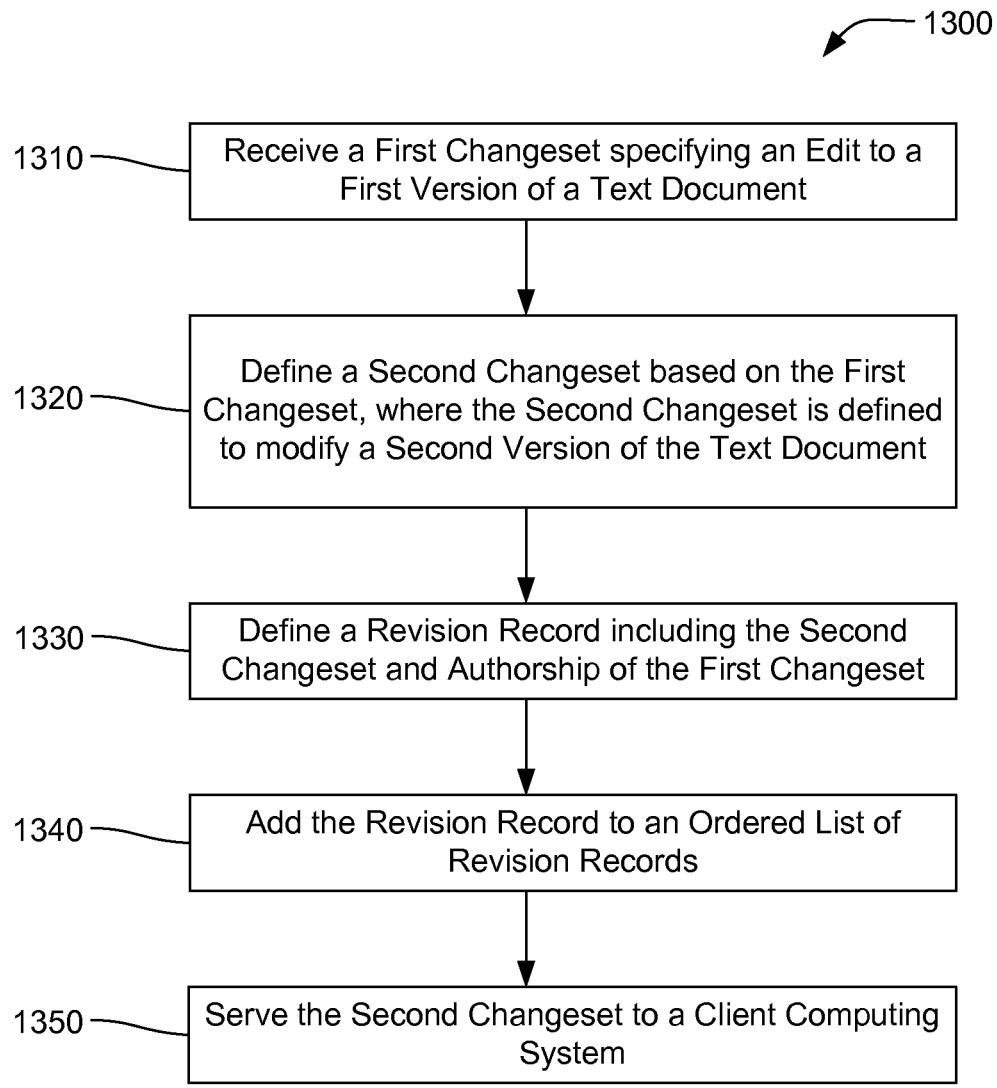
FIG. 11 is a flowchart representation of an exemplary method for collaboratively revising a text document according to an exemplary embodiment of the invention.

FIG. 11 is a flowchart representation of an exemplary method 1300 for collaboratively revising a text document according to an exemplary embodiment of the invention. The method 1300 can be performed, for example, by a host server system 110 such as a server.

The method 1300 comprises defining a new version of the text document in response to an edit, and updating one or more client computing systems to be consistent with the new version. Defining a new version of the text document comprises an operation 1310 of receiving a first changeset specifying an edit to a first version of a text document, an operation 1320 of defining a second changeset based on the first changeset, where the second changeset is defined to modify a second version of the text document, an operation 1330 of defining a revision record including the second changeset and the authorship of the first changeset, and an operation 1340 adding the revision record to an ordered list of revision records. Updating one or more client computing systems to be consistent with the new version comprises an operation 1350 of serving the second changeset to the one or more client computing systems.

The operation 1310 comprises receiving a first changeset specifying an edit to a first version of a text document. The first changeset can be received from a first client computing system 120, for instance. The edit can represent, for example, at least one insertion of a character and/or at least one deletion of a character from the first version of the text document. The first changeset, in some embodiments, specifies a change in a length of the first version of the text document due to the edit, specifies retained characters by their indices in the first version of the text document, and specifies an inserted character relative to the indices of the retained characters. In some embodiments, deletions of characters are denoted by the absence of their indices from the changeset. Optionally, the first changeset also specifies a revision number for the first version of the text document.

The operation 1320 comprises defining a second changeset based on the first changeset, where the second changeset is defined to modify a second version of the text document. Here, the second version of the text document is the latest version of the text document (also referred to herein as HEADTEXT). The second version will be a subsequent version to the first version of the text document, for example, when another changeset specifying an edit from a different client computing system 120 is received just before the first changeset is received in operation 1310. Accordingly, the second changeset specifies how to incorporate the edit specified in the first changeset into the latest version of the text document. The second changeset is based on the first changeset in that the second changeset is a follows changeset to incorporate edits of the first changeset.

The operation 1330 comprises defining a revision record including the second changeset and the authorship of the first changeset. The authorship of the first changeset can be a unique ID associated with the client computing system 120 from which the first changeset was received. The authorship, in some embodiments, is received with the first changeset. In other embodiments, the host computing system 120 can determine the authorship by keeping track of which TCP port is used for each connected client computing system 120 and by noting through which TCP port the changeset was received. Defining the revision record can also comprise, in some instances, including a revision number, where the revision number is assigned sequentially, in some embodiments.

The operation 1340 comprises adding the revision record to an ordered list of revision records. This operation can comprise storing the revision record in a memory. The operation 1350 comprises serving the second changeset to the one or more client computing systems 120.

Figure 12:
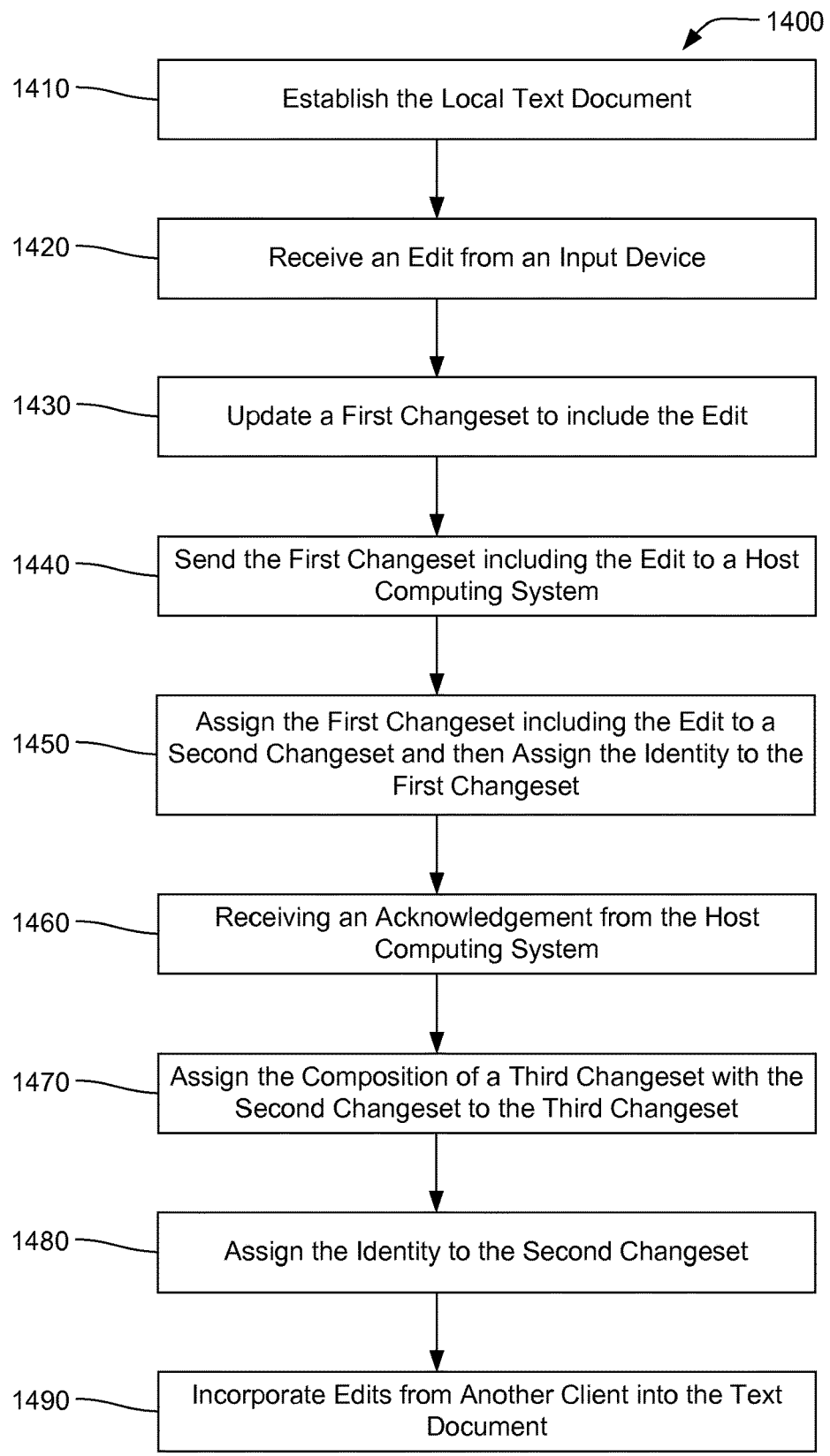
FIG. 12 is a flowchart representation of an exemplary method for collaboratively revising a text document according to an exemplary embodiment of the invention.

FIG. 12 is a flowchart representation of an exemplary method 1400 for collaboratively revising a text document according to an exemplary embodiment of the invention. The method 1400 can be performed, for example, by a client computing system 120 such as a computer. The method 1400 comprises revising the text document with locally created edits and providing the edits to a host server system 110. Revising the text document with locally created edits optionally comprises an operation 1410 of establishing the local text document. Revising the text document comprises an operation 1420 of receiving an edit from an input device, and an operation 1430 of updating a first changeset to include the edit. Providing the edits to the host server system 110 comprises an operation 1440 of sending the first changeset including the edit to the host server system 110, and an operation 1450 of assigning the first changeset including the edit to a second changeset and then assigning the identity to the first changeset. The method 1400 also comprises an operation 1460 of receiving an acknowledgement from the host server system 110, an operation 1470 after receiving the acknowledgement of assigning the composition of a third changeset with the second changeset to the third changeset, and an operation 1480 after assigning the composition to the third changeset of assigning the identity to the second changeset.

The method 1400 optionally includes the operation 1410 of establishing the local text document which comprises assigning the identity to first and second changesets and assigning a version of a text document to a third changeset. Where the composition of three changesets A, X, and Y are used to represent the local text document, the identity is assigned to both X and Y, while a version of the text document, such as HEADTEXT, is assigned to A.

In the operation 1420 an edit is received from an input device such as a keyboard of the client computing system performing the method 1400. The edit can represent, for example, at least one insertion of a character and/or at least one deletion of a character from a version of the text document. In the operation 1430 the first changeset is updated to include the edit. Here, for example, changeset Y is updated in operation 1430. Where the edit is represented as a changeset, E, updating Y comprises computing composition of YE and assigning the composition to Y.

In operation 1440 the first changeset including the edit is sent to the host server system 110. In some embodiments, the first changeset including the edit is sent to the host server system 110 with either or both of a version number and a unique ID. Sending the first changeset including the edit to the host computing system is performed, in some embodiments, within 500 ms from the time when the edit was received from the input device in operation 1420. Upon receipt, the host server system 110 responds with an acknowledgement which is received from the host server system 110 in operation 1460.

In operation 1450 the first changeset including the edit is assigned to a second changeset and then the identity is assigned to the first changeset. For example, Y is assigned to X and then the identity is assigned to Y. After the acknowledgement is received in operation 1460 from the host server system 110, in operation 1470 a third changeset is composed with the second changeset and the composition is assigned to the third changeset. For instance, A composed with X is assigned to A. Operation 1480 is performed after assigning the composition to the third changeset and comprises assigning the identity (I) to the second changeset. Thus, after A is composed with X is assigned to A, the identity (I) is assigned to X.

In additional embodiments, the method 1400 optionally comprises an operation 1490 of incorporating edits from another client into the text document. Operation 1490 is described in greater detail with respect to FIG. 13.

Figure 13:
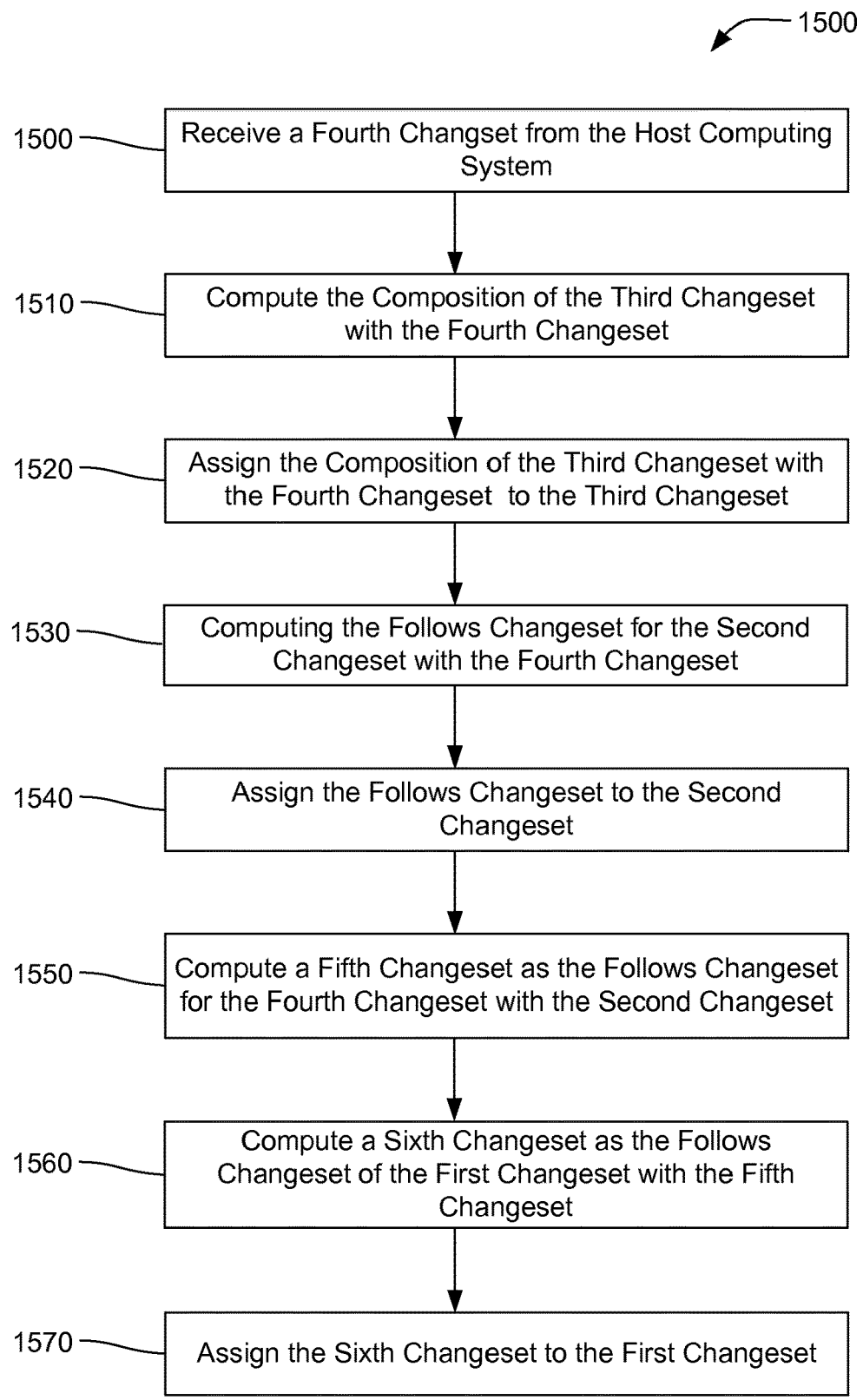
FIG. 13 is a flowchart illustrating a method of updating changesets in accordance with some embodiments.

FIG. 13 is a flowchart illustrating a method of updating changesets in accordance with some embodiments. In FIG. 13, operation 1490 of method 1400 includes operations for updating each of the three changesets A, X, and Y employed in operations 1410-1480. Thus, updating the third changeset, A, comprises an operation 1500 of receiving a fourth changeset from the host server system 110, such as changeset B, computing the composition of the third changeset with the fourth changeset (AB) in an operation 1510, and assigning the composition of the of the third changeset with the fourth changeset to the third changeset, A, in operation 1520.

Updating the second changeset, X, is performed by an operation 1530 of computing the follows changeset for the second changeset with the fourth changeset, f(B, X), and an operation 1540 of assigning the follows changeset to the second changeset, X. Updating the first changeset, Y, is performed by an operation 1550 of computing a fifth changeset as the follows changeset for the fourth changeset with the second changeset, f(X, B), an operation 1560 of computing a sixth changeset as the follows changeset of the first changeset with the fifth changeset, f(f(X, B), Y), and an operation 1570 of assigning the sixth changeset to the first changeset, Y.

Figure 14:
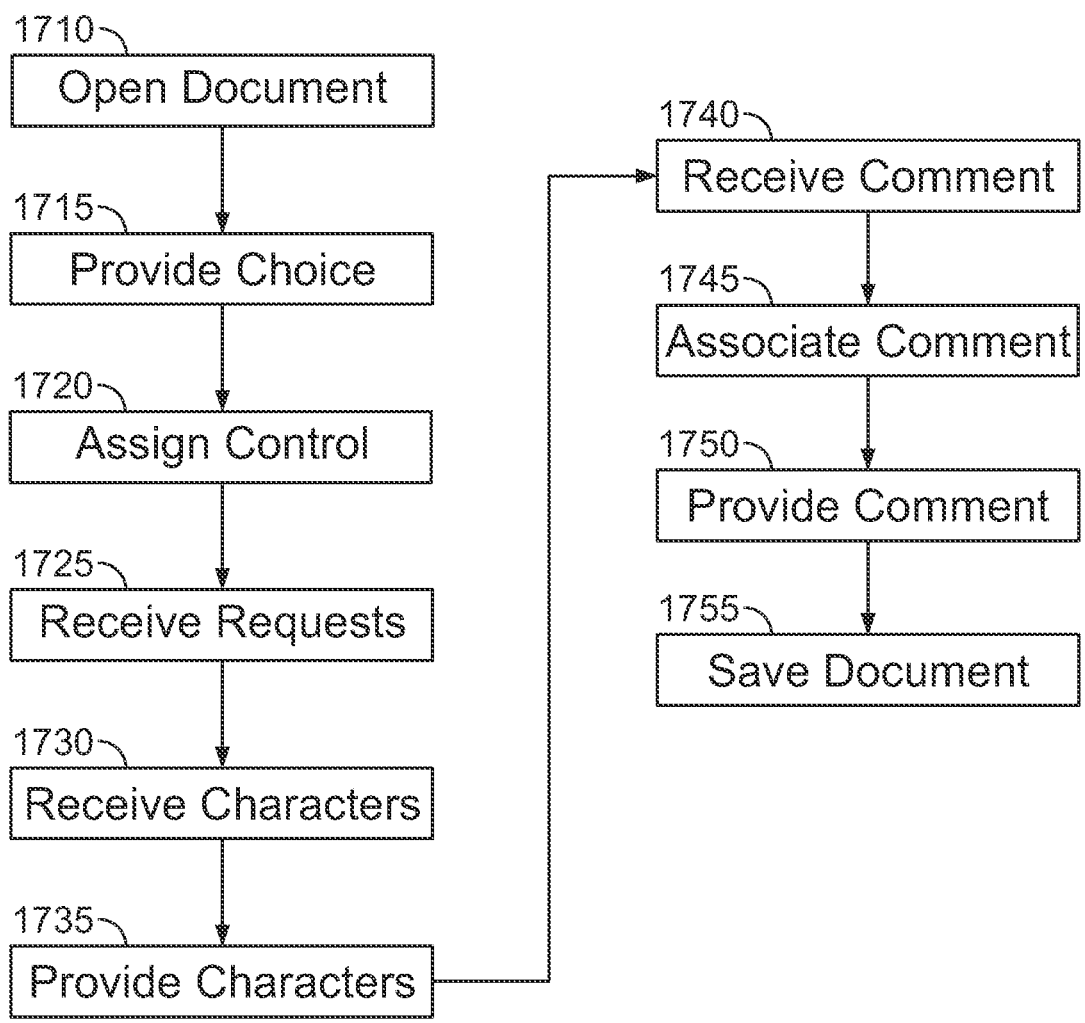
FIG. 14 is a flow chart illustrating the delivery of a realtime blog, according to various embodiments of the invention.

FIG. 14 is a flow chart illustrating the delivery of a realtime blog, according to various embodiments of the invention. The realtime blog includes one or more blog entry, each comprising at least one document. Typically, only one blog entry is live at a time, while other blog entries are static. However, realtime comments may be associated with a static blog entry. The delivery of a realtime blog, as illustrated, includes use of the systems and methods discussed elsewhere herein to provide a realtime editing environment. The operations illustrated in FIG. 14 may be performed in a wide variety of alternative orders.

In an open document operation 1710 a document is opened in a realtime editing environment. This document is associated with a blog entry. The document is optionally simultaneously editable by several users without locking of the document or a subset thereof.

In an optional provide choice operation 1715 editors and views of the blog are provided with a choice of viewing the document as a static object, which does not change unless explicitly refreshed, or as a realtime document, which changes in realtime as it is edited. These realtime changes can be on a character by character, word by word, or paragraph by paragraph basis. Provide choice operation 1715 is optionally performed at different times or multiple times during the delivery of a realtime blog.

In an optional assign control operation 1720 control of the document is assigned to at least one user, designated the master editor. In some embodiments, control is assigned equally to multiple users or is assigned to every user. This assignment process optionally includes security provisions such as use of a password or certificate. Assign control operation 1720 optionally includes delegation of privileges by the master editor to other users. As is discussed herein, this delegation can include access, editing, commenting and/or other privileges. The master editor is optionally the blog owner, in which case assign control operation 1720 can be accomplished by the blog owner logging into their blog, at which point any documents opened are automatically assigned.

In a receive requests operation 1725 one or more quests to view the document are received at host server system 110 from one or more client computing systems 120/, respectfully. These requests are optionally in the form of a TCP/IP request to access information at a specific universal resource locator. For example, the request may be generated by a user selecting a universal resource locator, document identifying parameters, and/or the like at client computing system 120. The request optionally includes a selection of whether the document is to be viewed as a static document or as a realtime document.

In a receive characters operation 1730, characters, other objects, modifications, and/or other information are received by host server system 110. The received information is typically received from the master editor and or other editors, and is used to modify a copy of the document stored at host server system 110. The modifications based on the information may include insertions, deletions and/or substations to existing objects (text, etc.) within the document or may result in new objects being added at the end of the documents. Receive characters operation 1730 typically continues during operations 1735-1750, which are discussed below.

In a provide characters operation 1735 the information received in receive characters operation 1730 is provided to one or more client computing systems 120 in realtime. The information is provided in a form configured for updating copies of the document stored on client computing systems 120. For example, in some embodiments the information is provided in as a series of one or more changesets. Different changesets may be provided to different client computing systems 120 depending on the state of each of the copies the documents on each of these client computing systems 120. If the document is being viewed in realtime at one or more of client computing systems 120, then the changesets are provided to that client computing system 120 in realtime as the information is received by host server system 110.

In an optionally receive comment operation 1740 a comment regarding the document and/or regarding another comment is received at host server system 110. The comment is typically received via network 130 from one of client computing systems 120. The comment can be received as a single block of objects or as a stream of objects. For example, the comment can be received as a stream of characters or as a static set of characters. If the comment is received as a stream of objects, then receive comment operation 1740 can continue during the execution of operations 1745 and 1750, discussed below. The received comment is optionally a realtime document. A realtime comment can be made on a static blog entry. A comment can be received while an editor, e.g., the master editor, is making changes to the document.

In an optionally associate comment operation 1745 the comment is associated with the document, with the blog entry, with the blog, with a specific object within the document, a specific object within another comment, with another comment, with a paragraph, with a word, with a sentence, and/or the like. The entity with which the comment is associated is optionally dependant on information received along with the comment from client computing system 120. For example, if a user specifies that a comment should be associated with a specific paragraph of a (static or realtime) blog entry, then this specification will be used to store the proper association at host server system 110.

In an optional provide comment operation 1750 the comment received in receive comment operation 1740 is provided to one or more client computing systems 120. The comment is optionally provided as a realtime document. For example, the comment may be provided as changesets in realtime as the comment is received by host server system 110. Any association of the comment made in associate comment operation 1745 is typically also provided to the one or more client computing systems 120.

In an optional save document operation 1755, the document is saved as a static document. The document may be stored at host server system 110 or at one or more of client computing systems 120. Optionally, the static document is saved as part of a static blog entry in a blog that includes a plurality of static blog entries.

While various features of the embodiments are disclosed herein with reference to blogs, these and other features may be applied to chat systems in which two or more users chat with each other using realtime text windows.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of providing a document to a plurality of thin clients for realtime editing, the method comprising:
    at a server having one or more processors and memory storing one or more programs for execution by the one or more processors to perform operations comprising,
        sending to the plurality of thin clients copies of a prior version of the document for realtime editing;
        obtaining two or more respective changesets for two or more respective thin clients in the plurality of thin clients, wherein a respective changeset represents a changed version of a respective copy of the document after applying one or more changes to a respective copy of the document at a respective thin client, and comprises:
            an indication of a change in length of the document from a first length of the prior version of the document to a second length of the changed version of the document, the indication of the change in length of the document identifying the first length of the prior version of the document and the second length of the changed version of the document;
            an array having an array length equal to the second length, each element at each consecutive index of the array representing each consecutive character of the changed version of the document, wherein each element comprises:
                an index of a character in the prior version of the document when the character is retained in the changed version of the document; and
                an added character when the added character is added in the changed version of the document;
        generating a merged result changeset from the two or more respective changesets based on a comparison of arrays of the two or more respective changesets in view of rules specifying which one or more characters from the two or more respective changesets to retain in the merged result changeset, wherein the merged result changeset comprises indices of characters retained in the two or more respective changesets; and
        sending the merged result changeset to the plurality of thin clients for updating the respective copies of the document at the plurality of thin clients.

2. The method of claim 1, further comprising updating the document stored at the server in accordance with the respective changesets.

3. The method of claim 1, further comprising:
    assigning editing-right-control to a master editor, wherein the editing-right-control is configured to modify an editing-right of the respective thin client; and
    wherein obtaining the respective changesets for the two or more respective thin clients includes receiving the respective changesets from the two or more respective thin clients when the two or more respective thin clients have the editing-right.

4. The method of claim 3, wherein the editing-right comprises an editing-right for commenting, and the method further comprises:
    sending content of the document in a webpage to the plurality of thin clients for realtime editing; and
    receiving the respective changesets from the respective thin clients comprises receiving the respective changeset from the respective thin client when the respective thin client has the editing-right for commenting and the respective changeset includes at least a portion of a respective comment on the document.

5. The method of claim 1, further comprising:
    sending content of the document in a webpage to the plurality of thin clients for realtime editing.

6. The method of claim 5, wherein the webpage includes instructions for determining the respective changeset in accordance with the inputs.

7. The method of claim 6, further comprising:
    sending an acknowledgment of the respective changeset to a respective thin client, and wherein the webpage comprises:
    instructions for maintaining at the respective thin client a set of changesets, the set of changesets comprising:
        a first changeset, representing changes not transmitted to the server; and
        a second changeset, representing changes transmitted to the server and not acknowledged by the server; and
    instructions for sending the first changeset to the server; and
    instructions for updating the second changeset in response to receipt of the acknowledgment of the respective changeset by the respective thin client.

8. The method of claim 7, wherein the webpage includes instructions for updating the set of changesets in accordance with the merged result changeset.

9. The method of claim 5, wherein the webpage includes instructions for:
    receiving the merged result changeset for updating the respective copy of the document at the respective thin client; and
    updating the respective copy of the document at the respective thin client in accordance with the merged result changeset.

10. The method of claim 5, wherein the webpage includes instructions for selecting to view changes to the document in realtime.

11. The method of claim 1, wherein the document includes at least a portion of a web log.

12. The method of claim 1, further comprising maintaining a revision record for the respective thin client.

13. The method of claim 1, wherein the merged changeset further comprises:
  indices of all characters added in one or more of the first and second changesets;
  excludes all characters retained in only one of the first and second changesets; and
  preserves consecutive characters from both changesets.

14. A server for providing a document to a plurality of thin clients for realtime editing, comprising:
  one or more processors; and
  memory storing one or more programs for execution by the one or more processors, the one or more programs including instructions to:
  send to the plurality of thin clients copies of a prior version of the document for realtime editing;
  obtain two or more respective changesets for two or more respective thin clients in the plurality of thin clients, wherein a respective changeset represents a changed version of a respective copy of the document after applying one or more changes to a respective copy of the document at a respective thin client, and comprises:
    an indication of a change in length of the document from a first length of the prior version of the document to a second length of the changed version of the document, the indication of the change in length of the document identifying the first length of the prior version of the document and the second length of the changed version of the document;
    an array having an array length equal to the second length, each element at each consecutive index of the array representing each consecutive character of the changed version of the document, wherein each element comprises:
      an index of a character in the prior version of the document when the character is retained in the changed version of the document; and
      an added character when the added character is added in the changed version of the document;
  generate a merged result changeset from the two or more respective changesets based on a comparison of arrays of the two or more respective changesets in view of rules specifying which one or more characters from the two or more respective changesets to retain in the merged result changeset, wherein the merged result changeset comprises indices of characters retained in the two or more respective changesets; and
  send the merged result changeset to the plurality of thin clients for updating the respective copies of the document at the plurality of thin clients.

15. A non-transitory computer readable storage medium storing one or more programs configured for execution by one or more processors of a server, the one or more programs comprising instructions to:
  send to the plurality of thin clients copies of a prior version of the document for realtime editing;
  obtain two or more respective changesets for two or more respective thin clients in the plurality of thin clients, wherein a respective changeset represents a changed version of a respective copy of the document after applying one or more changes to a respective copy of the document at a respective thin client, and comprises:
    an indication of a change in length of the document from a first length of the prior version of the document to a second length of the changed version of the document, the indication of the change in length of the document identifying the first length of the prior version of the document and the second length of the changed version of the document;
    an array having an array length equal to the second length, each element at each consecutive index of the array representing each consecutive character of the changed version of the document, wherein each element comprises:
      an index of a character in the prior version of the document when the character is retained in the changed version of the document; and
      an added character when the added character is added in the changed version of the document;
  generate a merged result changeset from the two or more respective changesets based on a comparison of arrays of the two or more respective changesets in view of rules specifying which one or more characters from the two or more respective changesets to retain in the merged result changeset, wherein the merged result changeset comprises indices of characters retained in the two or more respective changesets; and
  send the merged result changeset to the plurality of thin clients for updating the respective copies of the document at the plurality of thin clients.

16. A method of processing a document for realtime editing, the method comprising:
  at a thin client having one or more processors and memory storing one or more programs for execution by the one or more processors to perform the method,
  displaying at least a portion of a respective copy of a prior version of the document;
  receiving inputs from a respective user of the thin client for editing the document;
  sending, to a server connected to a plurality of clients, document information in accordance with the inputs, wherein the document information comprises:
    an indication of a change in length of the document from a first length of the prior version of the respective copy of the document to a second length of a changed version of the document, the indication of the change in length of the document identifying the first length of the prior version of the document and the second length of the changed version of the document;
    an array having an array length equal to the second length, each element at each consecutive index of the array representing each consecutive character of the changed version of the document, wherein each element comprises:
      an index of a character in the prior version of the document when the character is retained in the changed version of the document; and
      an added character when the added character is added in the changed version of the document;
  receiving a merged result changeset for updating the respective copy of the document at the thin client, wherein the merged result changeset represents a merger of changes to respective copies of the document at two or more thin clients in the plurality of thin clients, the merger of changes being based on a comparison of arrays from the two or more thin clients in view of rules specifying which one or more characters from the respective copies to retain in the merger of changes, and comprising
  indices of retained characters; and
  updating the respective copy of the document at the thin client in accordance with the merged result changeset.

17. The method of claim 16, further comprising determining a respective changeset in accordance with the inputs, wherein sending the document information comprises sending a respective changeset, and the respective changeset represents one or more changes to the document at the thin client.

18. The method of claim 17, further comprising:
maintaining a set of changesets at the thin client, the set of changesets comprising:
a first changeset, representing changes not transmitted to the server; and
a second changeset, representing changes transmitted to the server and not acknowledged by the server; and
displaying the changesets with the at least a portion of the document, wherein sending the respective changeset comprises sending the first changeset.

19. The method of claim 18, further comprising updating the set of changesets in accordance with the merged result changeset.

20. A thin client for processing a document for realtime editing, comprising:
a display device;
one or more processors; and
memory storing one or more programs for execution by the one or more processors, the one or more programs including instructions to:
display at least a portion of a respective copy of a prior version of the document;
receive inputs from a respective user of the thin client for editing the document;
send, to a server connected to a plurality of clients, document information in accordance with the inputs, wherein the document information comprises:
an indication of a change in length of the document from a first length of the prior version of the respective copy of the document to a second length of a changed version of the document, the indication of the change in length of the document identifying the first length of the prior version of the document and the second length of the changed version of the document;
an array having an array length equal to the second length, each element at each consecutive index of the array representing each consecutive character of the changed version of the document, wherein each element comprises:
an index of a character in the prior version of the document when the character is retained in the changed version of the document; and
an added character when the added character is added in the changed version of the document;
receive a merged result changeset for updating the respective copy of the document at the thin client, wherein the merged result changeset represents a merger of changes to respective copies of the document at two or more thin clients in the plurality of thin clients, the merger of changes being based on a comparison of arrays from two or more thin clients in view of rules specifying which one or more characters from the respective copies to retain in the merger of changes, and comprising
indices of retained characters; and
update the respective copy of the document at the thin client in accordance with the merged result changeset.

21. A non-transitory computer readable storage medium storing one or more programs configured for execution by one or more processors of a thin client, the one or more programs comprising instructions to:
display at least a portion of a respective copy of a prior version of the document;
receive inputs from a respective user of the thin client for editing the document;
send, to a server connected to a plurality of clients, document information in accordance with the inputs, wherein the document information comprises:
an indication of a change in length of the document from a first length of the prior version of the respective copy of the document to a second length of a changed version of the document, the indication of the change in length of the document identifying the first length of the prior version of the document and the second length of the changed version of the document;
an array having an array length equal to the second length, each element at each consecutive index of the array representing each consecutive character of the changed version of the document, wherein each element comprises:
an index of a character in the prior version of the document when the character is retained in the changed version of the document; and
an added character when the added character is added in the changed version of the document;
receive a merged result changeset for updating the respective copy of the document at the thin client, wherein the merged result changeset represents a merger of changes to respective copies of the document at two or more thin clients in the plurality of thin clients, the merger of changes being based on a comparison of arrays from two or more thin clients in view of rules specifying which one or more characters from the respective copies to retain in the merger of changes, and comprising
indices of retained characters; and
update the respective copy of the document at the thin client in accordance with the merged result changeset.

22. A method of providing a document to a plurality of thin clients for realtime editing, the method comprising:
at a server having one or more processors and memory storing one or more programs for execution by the one or more processors to perform operations comprising,
sending to the plurality of thin clients copies of a prior version of the document for realtime editing;
obtaining two or more respective changesets for two or more respective thin clients in the plurality of thin clients, wherein a respective changeset represents a changed version of a respective copy of the document after applying one or more changes to a respective copy of the document at a respective thin client, and comprises:
an indication of a change in length of the document from a first length of the prior version of the document to a second length of the changed version of the document, the indication of the change in length of the document identifying the first length of the prior version of the document and the second length of the changed version of the document;
an array having an array length equal to the second length, each element at each consecutive index of the array representing each consecutive character of the changed version of the document, wherein each element comprises:

an index of a character in the prior version of the document when the character is retained in the changed version of the document; or an added character when the added character is added in the changed version of the document;

generating a merged result changeset from the two or more respective changesets based on a comparison of arrays of the two or more respective changesets in view of rules specifying which one or more characters from the two or more respective changesets to retain in the merged result changeset, wherein the merged result changeset comprises indices of characters added in one or more of the first or second changesets, excludes characters retained in only one of the first or second changesets, and preserves consecutive characters from both changesets; and sending the merged result changeset to the plurality of thin clients for updating the respective copies of the document at the plurality of thin clients.

23. The method of claim 22, further comprising:

assigning editing-right-control to a master editor, wherein the editing-right-control is configured to modify an editing-right of the respective thin client; and wherein obtaining the respective changesets for the two or more respective thin clients includes receiving the respective changesets from the two or more respective thin clients when the two or more respective thin clients have the editing-right.

24. The method of claim 23, wherein the editing-right comprises an editing-right for commenting, and the method further comprises:

sending content of the document in a webpage to the plurality of thin clients for realtime editing; and receiving the respective changesets from the respective thin clients comprises receiving the respective changeset from the respective thin client when the respective thin client has the editing-right for commenting and the respective changeset includes at least a portion of a respective comment on the document.

25. A non-transitory computer readable storage medium storing one or more programs configured for execution by one or more processors of a server, the one or more programs comprising instructions to:

send to the plurality of thin clients copies of a prior version of the document for realtime editing;

obtain two or more respective changesets for two or more respective thin clients in the plurality of thin clients, wherein a respective changeset represents a changed version of a respective copy of the document after applying one or more changes to a respective copy of the document at a respective thin client, and comprises:

an indication of a change in length of the document from a first length of the prior version of the document to a second length of the changed version of the document, the indication of the change in length of the document identifying the first length of the prior version of the document and the second length of the changed version of the document;

an array having an array length equal to the second length, each element at each consecutive index of the array representing each consecutive character of the changed version of the document, wherein each element comprises:

an index of a character in the prior version of the document when the character is retained in the changed version of the document; or an added character when the added character is added in the changed version of the document;

generate a merged result changeset from the two or more respective changesets based on a comparison of arrays of the two or more respective changesets in view of rules specifying which one or more characters from the two or more respective changesets to retain in the merged result changeset, wherein the merged result changeset comprises indices of characters added in one or more of the first or second changesets, excludes characters retained in only one of the first or second changesets, and preserves consecutive characters from both changesets; and send the merged result changeset to the plurality of thin clients for updating the respective copies of the document at the plurality of thin clients.

* * * * *